United States Patent
He et al.

(10) Patent No.: US 11,467,836 B2
(45) Date of Patent: Oct. 11, 2022

(54) EXECUTING CROSS-CORE COPY INSTRUCTIONS IN AN ACCELERATOR TO TEMPORARILY STORE AN OPERAND THAT CANNOT BE ACCOMMODATED BY ON-CHIP MEMORY OF A PRIMARY CORE INTO A SECONDARY CORE

(71) Applicant: Alibaba Group Holding Limited, Grand Cayman (KY)

(72) Inventors: Jun He, Shanghai (CN); Li Yin, Shanghai (CN); Xuejun Wu, Shanghai (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/158,685

(22) Filed: Jan. 26, 2021

(65) Prior Publication Data
US 2021/0255866 A1 Aug. 19, 2021

(51) Int. Cl.
*G06F 9/30* (2018.01)
*G06F 9/38* (2018.01)

(52) U.S. Cl.
CPC ...... *G06F 9/30087* (2013.01); *G06F 9/30101* (2013.01); *G06F 9/3877* (2013.01)

(58) Field of Classification Search
CPC ..... G06F 9/00–3897; G06F 15/00–825; G06F 9/3877; G06F 9/3879; G06F 9/3881; G06F 9/30138; G06F 8/441; G06F 9/34; G06F 9/342; G06F 9/345
USPC ....................................................... 712/228
See application file for complete search history.

(56) References Cited

U.S. PATENT DOCUMENTS

| | | | | |
|---|---|---|---|---|
| 4,851,992 A | * | 7/1989 | Nakayama | G06F 9/3877 718/108 |
| 5,909,565 A | * | 6/1999 | Morikawa | G06F 9/3885 712/200 |
| 6,009,272 A | * | 12/1999 | Goebel | G06F 8/441 712/217 |
| 6,496,909 B1 | | 12/2002 | Schimmel | |
| 8,105,882 B2 | | 1/2012 | Jouppi | |
| 8,533,716 B2 | | 9/2013 | Lippett | |
| 9,146,747 B2 | | 9/2015 | Moloney et al. | |

(Continued)

FOREIGN PATENT DOCUMENTS

CN 109426549 A 3/2019
CN 209746539 U 12/2019

(Continued)

*Primary Examiner* — Keith E Vicary

(57) ABSTRACT

An acceleration unit including a primary core and a secondary core is provided. The primary core includes a first on-chip memory, a primary core sequencer adapted to decode a received first cross-core copy instruction, and a primary core memory copy engine adapted to acquire a first operand from a first address in the first on-chip memory and copy the acquired first operand to a second address in a second on-chip memory of the secondary core. Further, the secondary core includes a second on-chip memory, a secondary core sequencer adapted to decode a received second cross-core copy instruction, and a secondary core memory copy engine adapted to acquire the first operand from the second address in the second on-chip memory and copy the acquired first operand back to the first address in the first on-chip memory.

20 Claims, 14 Drawing Sheets

(56) References Cited

U.S. PATENT DOCUMENTS

| | | | |
|---|---|---|---|
| 9,360,927 B2 | 6/2016 | Herdrich et al. | |
| 9,407,554 B2 | 8/2016 | Mirani et al. | |
| 9,424,228 B2 | 8/2016 | Ramey et al. | |
| 9,575,807 B2 | 2/2017 | Murphy | |
| 9,753,771 B2 | 9/2017 | Lee et al. | |
| 10,095,543 B1 | 10/2018 | Griffin et al. | |
| 10,102,179 B2 | 10/2018 | Shalf et al. | |
| 10,445,234 B2 | 10/2019 | Fleming et al. | |
| 10,606,750 B1 | 3/2020 | Mattina et al. | |
| 11,086,650 B2 | 8/2021 | Palermo et al. | |
| 2001/0042193 A1* | 11/2001 | Fleck | G06F 9/3877 712/220 |
| 2003/0208723 A1* | 11/2003 | Killian | G06F 8/20 716/102 |
| 2006/0010305 A1* | 1/2006 | Maeda | G06F 9/3885 712/34 |
| 2010/0122199 A1* | 5/2010 | Darrington | H04L 63/0227 715/771 |
| 2011/0161945 A1* | 6/2011 | Kalogeropulos | G06F 8/441 717/152 |
| 2012/0110559 A1 | 5/2012 | Dolinsky et al. | |
| 2015/0095614 A1 | 4/2015 | Toll et al. | |
| 2018/0210732 A1* | 7/2018 | Zhu | G06F 9/50 |
| 2019/0034363 A1 | 1/2019 | Palermo et al. | |
| 2019/0205244 A1 | 7/2019 | Smith | |
| 2020/0012536 A1* | 1/2020 | Lacey | G06F 15/17331 |
| 2021/0089873 A1* | 3/2021 | Jiao | G06N 3/0454 |

FOREIGN PATENT DOCUMENTS

| | | |
|---|---|---|
| CN | 105765623 B | 4/2020 |
| EP | 2928136 A2 | 10/2015 |
| EP | 3532931 B1 | 4/2022 |
| KR | 20160027541 A | 3/2016 |

* cited by examiner

```
Pool   r8, r0
Conv   r1, r0
Conv   r3, r2
Conv   r5, r4
Add    r6, r3, r5
Mul    r7, r6, r0

Pool   r14, r13
...
Conv   r10, r1
rcp    r11, r10
```

FIG. 6A
PRIOR ART

Pool r8, r0
Conv r1, r0
410 — Store MEM, r1 — 401
Conv r3, r2
Conv r5, r4
Add r6, r3, r5
Mul r7, r6, r0
402
Pool r14, r13
•••
420 — Load r1, MEM
Conv r10, r1
rcp r11, r10

EXECUTING CROSS-CORE COPY INSTRUCTIONS IN AN ACCELERATOR TO TEMPORARILY STORE AN OPERAND THAT CANNOT BE ACCOMMODATED BY ON-CHIP MEMORY OF A PRIMARY CORE INTO A SECONDARY CORE

PRIORITY CLAIM

The present application claims priority to China Patent Application No. 202010082643.0 filed Feb. 7, 2020, and titled "ACCELERATION UNIT, SYSTEM-ON-CHIP, SERVER, DATA CENTER, AND RELATED METHOD", incorporated herein by reference in its entirety.

TECHNICAL FIELD

The present disclosure relates to the chip field, more specifically to an acceleration unit, a system-on-chip, a server, a data center and a related method.

BACKGROUND

In the big data era, neural networks are being widely used. On a neural network, processing a large quantity of computations (for example, convolution and pooling) of each neural network node by using a conventional CPU is very inefficient. Therefore, a special acceleration unit is developed, and is specially designed for an artificial intelligence neural network to accelerate computations of the neural network, and address low efficiency of a conventional chip in the computations of the neural network. The acceleration unit typically has a plurality of cores, and each core has an on-chip memory. All cores may perform a same model task in parallel, so that the cores have an exactly same instruction and exactly same initialization weight data, and a plurality of inference tasks may be performed simultaneously. Alternatively, all cores may have different computing instruction sequences, initialization weight data, and inputs, to perform different model tasks. Division of labor and collaboration between the cores greatly improve a processing capacity of the acceleration unit.

In an on-chip memory allocation algorithm of a conventional acceleration-unit core, because an on-chip memory is limited, it is impossible for all operands to reside in the on-chip memory. In this case, an operand that cannot be accommodated in the on-chip memory is usually placed in a memory that is outside the core and that is shared by a plurality of cores, and is read back to the on-chip memory when necessary. Efficiency of transferring data from inside of the core to the shared memory outside the core is very low, causing degradation of performance of an existing acceleration unit.

SUMMARY

In view of this, embodiments of the present disclosure are intended to improve operand transfer efficiency and performance of an acceleration unit when an operand in an on-chip memory inside a core needs to be transferred.

To achieve the objective, according to an aspect of the present disclosure, an acceleration unit is provided, including an acceleration-unit primary core and an acceleration-unit secondary core. The acceleration-unit primary core includes: a first on-chip memory; a primary core sequencer adapted to decode a received first cross-core copy instruction, where the first cross-core copy instruction instructs to copy a first operand from a first address in the first on-chip memory to a second address in a second on-chip memory of the acceleration-unit secondary core; and a primary core memory copy engine adapted to receive and execute a decoded first cross-core copy instruction, to acquire the first operand from the first address in the first on-chip memory, and copy the acquired first operand to the second address in the second on-chip memory. The acceleration-unit secondary core includes: the second on-chip memory; a secondary core sequencer adapted to decode a received second cross-core copy instruction, where the second cross-core copy instruction instructs to copy the first operand from the second address in the second on-chip memory back to the first address in the first on-chip memory; and a secondary core memory copy engine adapted to receive and execute a decoded second cross-core copy instruction, to acquire the first operand from the second address in the second on-chip memory, and copy the acquired first operand back to the first address in the first on-chip memory.

Optionally, the acceleration-unit primary core further includes a first register and a second register adapted to store the first address and the second address respectively, and the first cross-core copy instruction instructs to use the first address in the first register as a source address for cross-core copy, and use the second address in the second register as a destination address for cross-core copy, so that the primary core memory copy engine transfers the first operand in the first address to the second address; and the acceleration-unit secondary core further includes a third register and a fourth register adapted to store the second address and the first address respectively, and the second cross-core copy instruction instructs to use the second address in the third register as a source address for cross-core copy, and use the first address in the fourth register as a destination address for cross-core copy, so that the secondary core memory copy engine transfers the first operand in the second address back to the first address.

Optionally, the acceleration-unit primary core further includes a primary core instruction cache adapted to receive and cache the first cross-core copy instruction and provide the first cross-core copy instruction for the primary core sequencer, and the acceleration-unit secondary core further includes a secondary core instruction cache adapted to receive and cache the second cross-core copy instruction and provide the second cross-core copy instruction for the secondary core sequencer.

Optionally, the primary core instruction cache is adapted to: before receiving and caching the first cross-core copy instruction, receive and cache a first primary core synchronization primitive instruction adapted to synchronize the primary core and the secondary core, and the primary core sequencer is adapted to decode the cached first primary core synchronization primitive instruction, and send a decoded first primary core synchronization primitive instruction to a command processor outside the acceleration-unit primary core; and the secondary core instruction cache is adapted to receive and cache a first secondary core synchronization primitive instruction corresponding to the first primary core synchronization primitive instruction, and a first dumb cross-core copy instruction corresponding to the first cross-core copy instruction; and the secondary core sequencer is adapted to decode the cached first secondary core synchronization primitive instruction and the cached first dumb cross-core copy instruction, send a decoded first secondary core synchronization primitive instruction to a command processor outside the acceleration-unit secondary core for synchronizing the primary core and the secondary core according to the first primary core synchronization primitive instruction and the first secondary core synchronization primitive instruction, and ignore a decoded first dumb cross-core copy instruction.

Optionally, the primary core instruction cache receives and caches the first primary core synchronization primitive instruction after receiving and caching an instruction in which the first operand is used for the last time before a second operand appears in a to-be-executed instruction sequence, where the second operand is an operand that is to cause the first on-chip memory to overflow when the to-be-executed instruction sequence is executed.

Optionally, the primary core instruction cache receives and caches a second primary core synchronization primitive instruction before receiving and caching an instruction in which the second operand appears in the to-be-executed instruction sequence for the first time, and the primary core sequencer is adapted to decode the cached second primary core synchronization primitive instruction, and send a decoded second primary core synchronization primitive instruction to the command processor outside the acceleration-unit primary core; and the secondary core instruction cache receives and caches a second secondary core synchronization primitive instruction corresponding to the second primary core synchronization primitive instruction after receiving and caching the first dumb cross-core copy instruction, and the secondary core sequencer is adapted to decode the cached second secondary core synchronization primitive instruction, and send a decoded second secondary core synchronization primitive instruction to the command processor outside the acceleration-unit secondary core for synchronizing the primary core and the secondary core according to the second primary core synchronization primitive instruction and the second secondary core synchronization primitive instruction.

Optionally, the primary core instruction cache sequentially receives a third primary core synchronization primitive instruction and a second dumb cross-core copy instruction corresponding to the second cross-core copy instruction after receiving and caching an instruction in which the second operand appears in the to-be-executed instruction sequence for the last time, and the primary core sequencer is adapted to decode the cached third primary core synchronization primitive instruction and second dumb cross-core copy instruction, and send a decoded third primary core synchronization primitive instruction to the command processor outside the acceleration-unit primary core, and ignore a decoded second dumb cross-core copy instruction; and the secondary core instruction cache receives and caches a third secondary core synchronization primitive instruction before receiving and caching the second cross-core copy instruction and after receiving and caching the second primary core synchronization primitive instruction, and the secondary core sequencer is adapted to decode the cached third secondary core synchronization primitive instruction, and send a decoded third secondary core synchronization primitive instruction to the command processor outside the acceleration-unit secondary core for synchronizing the primary core and the secondary core according to the third primary core synchronization primitive instruction and the third secondary core synchronization primitive instruction.

Optionally, the primary core instruction cache receives and caches a fourth primary core synchronization primitive instruction before receiving and caching an instruction in which the first operand is used for the first time after the second operand appears in the to-be-executed instruction sequence for the last time, and the primary core sequencer is adapted to decode the cached fourth primary core synchronization primitive instruction, and send a decoded fourth primary core synchronization primitive instruction to the command processor outside the acceleration-unit primary core; and the secondary core instruction cache receives and caches a fourth secondary core synchronization primitive instruction corresponding to the fourth primary core synchronization primitive instruction after receiving and caching the second cross-core copy instruction, and the secondary core sequencer is adapted to decode the cached fourth secondary core synchronization primitive instruction, and send a decoded fourth secondary core synchronization primitive instruction to the command processor outside the acceleration-unit secondary core for synchronizing the primary core and the secondary core according to the fourth primary core synchronization primitive instruction and the fourth secondary core synchronization primitive instruction.

Optionally, the acceleration unit has a plurality of secondary cores, and the second address in the second register is a second address in a second on-chip memory of a selected acceleration-unit secondary core in the plurality of acceleration-unit secondary cores.

Optionally, the selected acceleration-unit secondary core is selected from the plurality of acceleration-unit secondary cores based on a distance from each of the plurality of acceleration-unit secondary cores to the acceleration-unit primary core.

According to an aspect of the present disclosure, an acceleration unit is provided, including an acceleration-unit primary core, a first acceleration-unit secondary core, and a second acceleration-unit secondary core. The acceleration-unit primary core includes:

a first on-chip memory; a primary core sequencer adapted to decode a received first cross-core copy instruction, where the first cross-core copy instruction instructs to copy a first part of a to-be-transferred operand set from a first address set in the first on-chip memory to a second address set in a second on-chip memory of the first acceleration-unit secondary core, and copy a second part of the to-be-transferred operand set from a third address set in the first on-chip memory to a fourth address set in a third on-chip memory of the second acceleration-unit secondary core; and a primary core memory copy engine adapted to receive and execute a decoded first cross-core copy instruction, to acquire the first part from the first address set in the first on-chip memory and copy the acquired first part to the second address set in the second on-chip memory of the first acceleration-unit secondary core, and to acquire the second part from the third address set in the first on-chip memory and copy the acquired second part to the fourth address set in the third on-chip memory of the second acceleration-unit secondary core. The first acceleration-unit secondary core includes: the second on-chip memory; a first secondary core sequencer adapted to decode a received second cross-core copy instruction, where the second cross-core copy instruction instructs to copy the first part from the second address set in the second on-chip memory back to the first address set in the first on-chip memory; and a first secondary core memory copy engine adapted to receive and execute a decoded second cross-core copy instruction, to acquire the first part from the second address set in the second on-chip memory, and copy the acquired first part back to the first address set in the first on-chip memory set. The second acceleration-unit secondary core includes: the third on-chip memory; a second secondary core sequencer adapted to decode a received third cross-core copy instruction, where the third cross-core copy instruction instructs to copy the second part from the fourth address set in the third on-chip memory back to the third address set in the first on-chip memory; and a second secondary core memory copy engine adapted to receive and execute a decoded third cross-core copy instruction, to acquire the second part from the fourth address set in the third on-chip memory, and copy the acquired second part back to the third address set in the first on-chip memory set.

Optionally, the acceleration-unit primary core further includes: a first head address register and a first tail address register adapted to store a head address and a tail address of the first address set respectively, a second head address register and a second tail address register adapted to store a head address and a tail address of the second address set respectively, a third head address register and a third tail address register adapted to store a head address and a tail address of the third address set respectively, and a fourth head address register and a fourth tail address register adapted to store a head address and a tail address of the fourth address set respectively, where the first cross-core copy instruction instructs to fetch a first part between the head address in the first head address register and the tail address in the first tail address register in the first on-chip memory, and copy the first part to a location between the head address in the second head address register and the tail address in the second tail address register in the second on-chip memory, and to fetch a second part between the head address in the third head address register and the tail address in the third tail address register in the first on-chip memory, and copy the second part to a location between the head address in the fourth head address register and the tail address in the fourth tail address register in the third on-chip memory;

the first acceleration-unit secondary core further includes: a fifth head address register and a fifth tail address register adapted to store a head address and a tail address of the second address set respectively, and a sixth head address register and a sixth tail address register adapted to store a head address and a tail address of the first address set respectively, where the second cross-core copy instruction instructs to fetch a first part between the head address in the fifth head address register and the tail address in the fifth tail address register in the second on-chip memory, and copy the first part back to a location between the head address in the sixth head address register and the tail address in the sixth tail address register in the first on-chip memory; and the second acceleration-unit secondary core further includes: a seventh head address register and a seventh tail address register adapted to store a head address and a tail address of the fourth address set respectively, and an eighth head address register and an eighth tail address register adapted to store a head address and a tail address of the third address set respectively, where the third cross-core copy instruction instructs to fetch a second part between the head address in the seventh head address register and the tail address in the seventh tail address register in the third on-chip memory, and copy the second part back to a location between the head address in the eighth head address register and the tail address in the eighth tail address register in the first on-chip memory.

Optionally, the acceleration-unit primary core further includes a primary core instruction cache adapted to receive and cache the first cross-core copy instruction and provide the first cross-core copy instruction for the primary core sequencer, the first acceleration-unit secondary core further includes a first secondary core instruction cache adapted to receive and cache the second cross-core copy instruction and provide the second cross-core copy instruction for the first secondary core sequencer, and the second acceleration-unit secondary core further includes a second secondary core instruction cache adapted to receive and cache the third cross-core copy instruction and provide the third cross-core copy instruction for the second secondary core sequencer.

According to another aspect of the present disclosure, a system-on-chip is provided, including the foregoing acceleration unit.

According to another aspect of the present disclosure, a server is provided, including: the foregoing acceleration unit; a memory storing a computer-executable instruction; and a scheduling unit adapted to: in a process of executing the computer-executable instruction stored in the memory, determine a to-be-executed instruction sequence that needs to be executed by the acceleration unit, and allocate the to-be-executed instruction sequence to the acceleration unit.

According to another aspect of the present disclosure, a data center is provided, including the foregoing server.

According to another aspect of the present disclosure, a cross-core copy method for an acceleration unit is provided. The acceleration unit includes an acceleration-unit primary core and an acceleration-unit secondary core. The method includes: decoding and executing a received first cross-core copy instruction by using the acceleration-unit primary core, to acquire a first operand from a first address in a first on-chip memory of the acceleration-unit primary core, and copy the acquired first operand to a second address in a second on-chip memory of the acceleration-unit secondary core; and decoding and executing a received second cross-core copy instruction by using the acceleration-unit secondary core, to acquire the first operand from the second address in the second on-chip memory of the acceleration-unit secondary core, and copy the acquired first operand back to the first address in the first on-chip memory of the acceleration-unit primary core.

According to an aspect of the present disclosure, a cross-core copy method for an acceleration unit is provided. The acceleration unit includes an acceleration-unit primary core, a first acceleration-unit secondary core, and a second acceleration-unit secondary core. The method includes: decoding and executing a received first cross-core copy instruction by using the acceleration-unit primary core, to acquire the first part from the first address set in the first on-chip memory and copy the acquired first part to the second address set in a second on-chip memory of the first acceleration-unit secondary core, and to acquire the second part from the third address set in the first on-chip memory and copy the acquired second part to the fourth address set in the third on-chip memory of the second acceleration-unit secondary core; decoding and executing a received second cross-core copy instruction by using the first acceleration-unit secondary core, to acquire the first part from the second address set in the second on-chip memory, and copy the acquired first part back to the first address set in the first on-chip memory; and decoding and executing a received third cross-core copy instruction by using the second acceleration-unit secondary core, to acquire the second part from the fourth address set in the third on-chip memory, and copy the acquired second part back to the third address set in the first on-chip memory set.

In the embodiments of the present disclosure, the first cross-core copy instruction is added to an appropriate location in the to-be-executed instruction sequence, and after receiving the first cross-core copy instruction, the acceleration-unit primary core decodes and executes the received first cross-core copy instruction, to acquire the first operand from the first address in the first on-chip memory of the acceleration-unit primary core, and copy the acquired first operand to the second address in the second on-chip memory of the acceleration-unit secondary core, thereby transferring the first operand that may overflow to the acceleration-unit secondary core. In addition, the second cross-core copy instruction is allocated to the acceleration-unit secondary core for execution. When the first operand needs to be fetched from the acceleration-unit secondary core, the acceleration-unit secondary core decodes and executes the received second cross-core copy instruction, to acquire the first operand from the second address in the second on-chip memory of the acceleration-unit secondary core, and copy the acquired first operand back to the first address in the first on-chip memory of the acceleration-unit primary core. With the foregoing process, an objective of transferring, when an operand stored in the first on-chip memory of the acceleration-unit primary core may overflow, the operand that is to overflow to the acceleration-unit secondary core, and fetching the operand from the acceleration-unit secondary core in a timely manner when necessary is realized. Compared with a prior-art manner of copying data in an on-chip memory to an off-chip shared memory, in the embodiments of the present disclosure, efficiency of moving data between on-chip memories is higher than efficiency of moving data in an on-chip memory to an off-chip shared memory, thereby improving performance of the acceleration unit.

BRIEF DESCRIPTION OF DRAWINGS

Descriptions of the embodiments of the present disclosure with reference to the following accompanying drawings make the foregoing and other objectives, features, and advantages of the present disclosure clearer. In the accompanying drawings:

FIG. 6A illustrates a to-be-executed instruction sequence according to an embodiment of the present disclosure;

FIG. 6B illustrates an instruction added during compilation to move some operands to a shared memory because an overflow is to occur during execution in the prior art;

DESCRIPTION OF EMBODIMENTS

Figure 1:
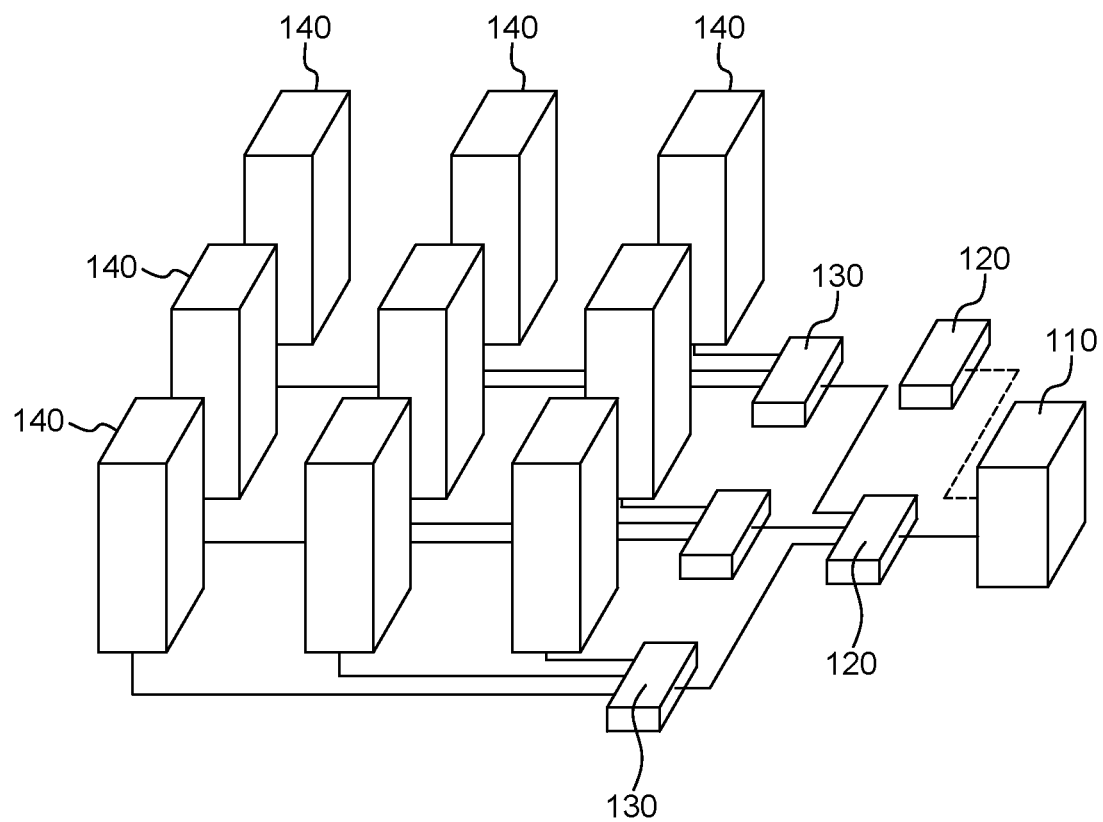
FIG. 1 is a structural diagram of a data center to which an embodiment of the present disclosure is applied.

The following describes the present disclosure based on embodiments, but the present disclosure is not limited to these embodiments. In the following detailed descriptions of the present disclosure, some specific details are described. Those skilled in the art can fully understand the present disclosure without the descriptions of the details. To avoid obscuring the essence of the present disclosure, well-known methods, processes, and procedures are not described in detail. In addition, the drawings are not necessarily drawn to scale.

The following terms are used in this specification.

Neural network: Neural network generally refers to an artificial neural network (Artificial Neural Network, ANN for short), and is an algorithmic mathematical model that imitates behavioral characteristics of an animal neural network to perform distributed parallel information processing. This network relies on a degree of system complexity and achieves an objective of information processing by adjusting an interconnection relationship between a large quantity of internal nodes.

Acceleration unit: a processing unit designed to increase a data processing speed in some special-purpose fields for a case in which a conventional processing unit has low efficiency in the special-purpose fields (for example, processing images and processing various operations of a neural network). In the embodiments of the present disclosure, the acceleration unit is mainly a special processing unit designed to increase a computation processing speed of a neural network model.

Scheduling unit: a processing unit that schedules an acceleration unit and allocates, to each acceleration unit, a to-be-executed instruction sequence that needs to be executed. The scheduling unit may be in a plurality of forms such as a central processing unit (CPU), an application-specific integrated circuit (ASIC), and a field programmable gate array (FPGA).

Primary core: a core that is in an acceleration unit and that is allocated to execute a to-be-executed instruction sequence to perform a series of entity operations or computations.

Secondary core: a core that is in an acceleration unit and that is not adapted to perform entity operations or computations but only collaborates with a primary core to: when an on-chip memory of the primary core cannot accommodate an operand required for running an instruction sequence, temporarily store the operand that cannot be accommodated for the primary core, and copy the operand back to an address of the on-chip memory of the primary core when the on-chip memory of the primary core can accommodate the operand. It should be noted that the primary core and the secondary core herein are merely intended for convenience of description, and a differentiation thereof is not absolute. For a to-be-executed instruction sequence, a core allocated to execute the to-be-executed instruction sequence is a primary core for the to-be-executed instruction sequence, and a core that temporarily accommodates an operand for the primary core is a secondary core. However, for another to-be-executed instruction sequence, a case may be opposite.

On-chip memory: a memory that is used independently in a primary core or a secondary core and cannot be shared.

Command processor: a command interface between an acceleration unit and a scheduling unit that drives the acceleration unit to work. The command processor receives instructions from the scheduling unit for the acceleration unit to execute, and distributes the instructions to cores in the acceleration unit for execution. In addition, the command processor is further responsible for synchronizing the cores of the acceleration unit.

Cross-core copy: a behavior of transferring some operands to an on-chip memory of a secondary core first, and then transferring the operands back when necessary because an on-chip memory of a primary core cannot accommodate an operand to be used during execution of an instruction sequence.

Cross-core copy instruction: an instruction for copying an operand from an on-chip memory of one core to an on-chip memory of another core in the embodiments of the present disclosure. The cross-core copy instruction is usually in a form of LMCPY X1, X2, where X1 is a destination address for copy, and X2 ia source address of an operand that needs to be copied.

Operand: The operand is an entity on which an operator acts, and is a component of an expression. The operand specifies an amount of digital computations in an instruction.

Synchronization: a behavior of ensuring a consistent execution progress between cores. Progresses of executing instructions by two cores are inconsistent. When one core finishes executing an instruction, the other core may be executing another instruction. Synchronization means waiting for the other core to finish execution so that the two cores simultaneously start to execute their subsequent instructions.

Synchronization primitive instruction: a primitive instruction used for synchronization between cores in the embodiments of the present, generally denoted as SYNC.LMCPY, and used in pairs, that is, a same synchronization primitive instruction is added to a location at which an instruction sequence executed by each of two to-be-synchronized cores needs to be synchronized.

Data Center

A data center is a globally collaborative specific device network used to transfer, accelerate, display, calculate, and store data information on Internet network infrastructure. In future development, the data center will also become a competitive asset for enterprises. With extensive use of data centers, artificial intelligence and the like are increasingly applied to the data centers. As an important technology of artificial intelligence, neural networks have been widely applied to big data analysis operations of data centers.

In a conventional large-scale data center, a network structure is usually shown in FIG. 1, that is, a hierarchical inter-networking model (hierarchical inter-networking model). The model includes the following parts.

Server 140: Each server 140 is a processing and storage entity of the data center, and processing and storage of a large amount of data in the data center are performed by the server 140.

Access switch 130: The access switch 130 is a switch adapted to connect the server 140 to the data center. One access switch 130 accesses a plurality of servers 140. The access switch 130 is usually located at the top of a rack and therefore is also referred to as a top of rack (Top of Rack) switch, and is physically connected to the server.

Aggregation switch 120: Each aggregation switch 120 is connected to a plurality of access switches 130, and provides other services such as a firewall, intrusion detection, and network analysis.

Core switch 110: The core switch 110 provides high-speed forwarding for packets entering and exiting the data center, and provides connectivity for the aggregation switch 120. An entire data center network is divided into an L3 layer routing network and an L2 layer routing network. The core switch 110 usually provides a flexible L3 layer routing network for the entire data center network.

Usually, the aggregation switch 120 is a demarcation point of the L2 and L3 layer routing networks. The L2 network is below the aggregation switch 120, and the L3 network is above the aggregation switch 120. Each group of aggregation switches manages a point of delivery (POD, Point Of Delivery), and each POD is an independent VLAN network. An IP address and a default gateway do not need to be modified for server migration within a POD, because one POD corresponds to one L2 broadcast domain.

A spanning tree protocol (STP, Spanning Tree Protocol) is usually used between the aggregation switch 120 and the access switch 130. The STP makes only one aggregation switch 120 available for one VLAN network, and other aggregation switches 120 are used only when the aggregation switch 120 is faulty (a dashed line in the figure). In other words, horizontal expansion is impossible at a level of the aggregation switch 120, because only one aggregation switch 120 works even if a plurality of aggregation switches 120 are added.

Server

Figure 2:
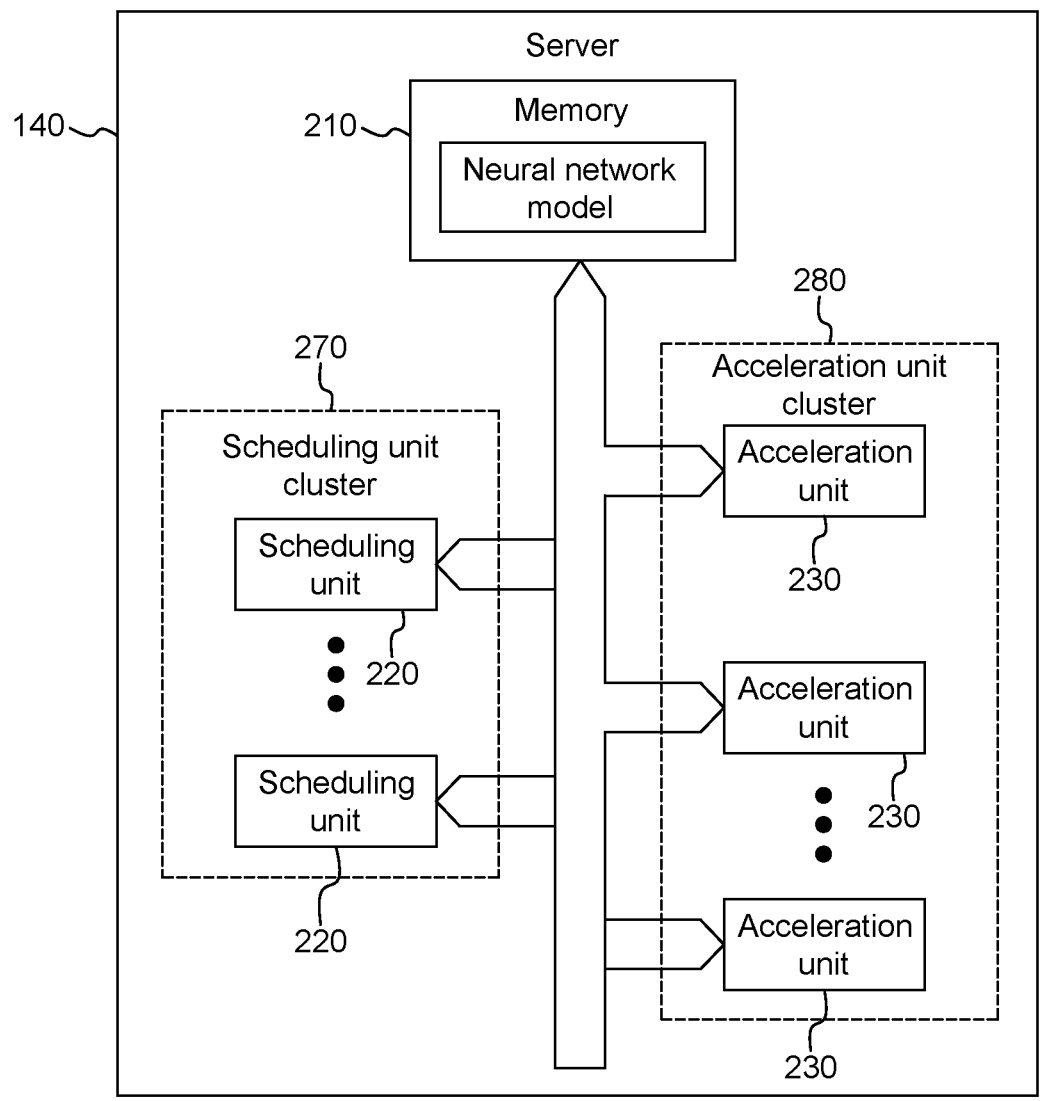
FIG. 2 is an internal structural diagram of a server in a data center according to an embodiment of the present disclosure.

Because the server 140 is a real processing device in the data center, FIG. 2 illustrates an internal structural block diagram of the server 140. The server 140 includes a memory 210, a scheduling unit cluster 270, and an acceleration unit cluster 280 that are connected by using a bus. The scheduling unit cluster 270 includes a plurality of scheduling units 220. The acceleration unit cluster 280 includes a plurality of acceleration units 230. In the embodiments of the present disclosure, the acceleration unit is mainly a special processing unit designed to increase a computation processing speed of a neural network model, and may be embodied as a processing unit, a graphics processing unit (GPU), an application-specific integrated circuit (ASIC), a field programmable gate array (FPGA), or the like that is specially designed for computation processing of a neutral network. The scheduling unit is a processing unit that schedules the acceleration unit and allocates, to each acceleration unit, a to-be-executed instruction sequence that needs to be executed. The scheduling unit may be in a plurality of forms such as a central processing unit (CPU), an application-specific integrated circuit (ASIC), and a field programmable gate array (FPGA).

In an architectural design of a conventional central processing unit, a control unit and a storage unit occupy a very large part of space in an architecture, but a computing unit occupies insufficient space. Therefore, the conventional central processing unit is very efficient in logic control, but is insufficiently efficient in large-scale parallel computations. Therefore, a variety of special acceleration units are developed to perform more efficient processing with an increased computation speed for computations in different functions and different fields. The acceleration unit proposed in the present invention is a processing unit specially used to increase the computation processing speed of the neural network model. The acceleration unit is a processing unit that processes a large quantity of computations (for example, convolution and pooling) of each neural network node by using a data-driven parallel computing architecture. Data and intermediate results in the large quantity of computations (for example, convolution and pooling) of each neural network node are closely related in an entire computation process, and are frequently used. In the existing architecture of the central processing unit, because a memory capacity of a core of the central processing unit is very small, a memory outside the core needs to be frequently accessed, thereby causing low processing efficiency. With the acceleration unit specially used to increase the computation processing speed of the neural network model, because each core has an on-chip memory with a storage capacity suitable for neural network computations, frequent access to a memory outside the core is avoided, so that processing efficiency and computation performance can be greatly improved.

The acceleration unit 230 needs to be scheduled by the scheduling unit 220. As shown in FIG. 2, various neural network models are stored in the memory 210, including nodes of the models, weight data of the nodes, and the like. The neural network models are deployed by a scheduling unit 220 in FIG. 2 to an acceleration unit 230 when necessary. That is, the scheduling unit 220 may send an address, in the memory 210, of a parameter (for example, a weight of each node) in the model to the acceleration unit 230 in a form of an instruction. When the acceleration unit 230 actually uses the neural network model for computations, the acceleration unit 230 directly addresses the parameter (for example, the weight) in the memory 210 based on the address of the parameter in the memory 210, and temporarily stores the parameter in an on-chip memory of the acceleration unit 230. When the acceleration unit 230 actually uses the neural network model for computations, the scheduling unit 220 further sends an input parameter of the model to the acceleration unit 230 in a form of an instruction, and the parameter is temporarily stored in the on-chip memory of the acceleration unit 230. In this way, the acceleration unit 230 may perform inference computations based on the input parameter and the parameter (for example, the weight) in the model.

Internal Structures of the Scheduling Unit and the Acceleration Unit

Figure 3:
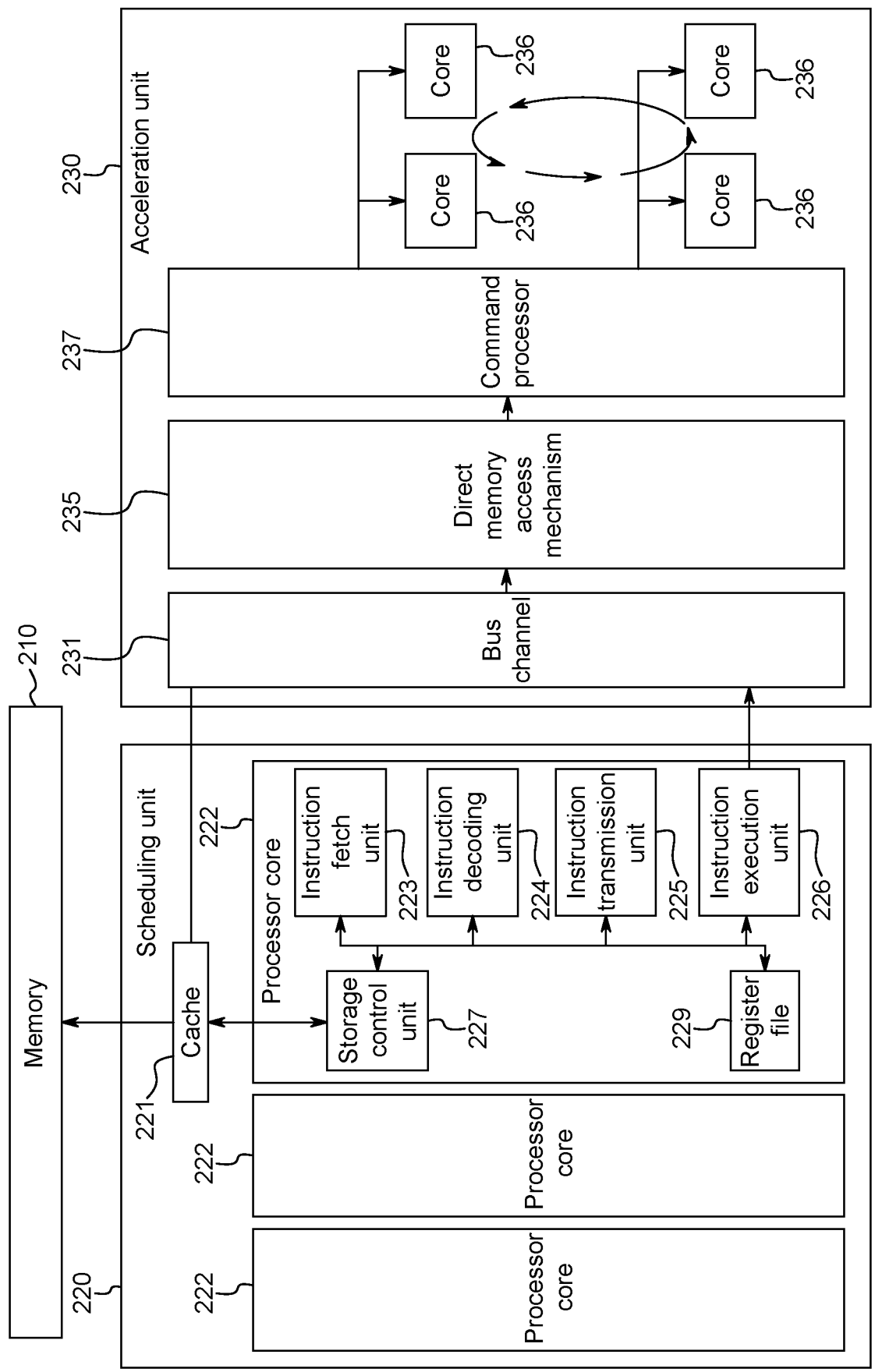
FIG. 3 is a diagram of a connection relationship between a scheduling unit and an acceleration unit in a server according to an embodiment of the present disclosure.

With reference to an internal structural diagram of the scheduling unit 220 and the acceleration unit 230 in FIG. 3, the following specifically describes how the scheduling unit 220 schedules the acceleration unit 230 to work.

As shown in FIG. 3, the scheduling unit 220 includes a plurality of processor cores 222 and a cache 221 shared by the plurality of processor cores 222. Each processor core 222 includes an instruction fetch unit 223, an instruction decoding unit 224, an instruction transmission unit 225, an instruction execution unit 226, and a storage control unit 227.

The instruction fetch unit 223 is adapted to transport a to-be-executed instruction from the memory 210 to an instruction register (which may be a register that is in a register file 229 shown in FIG. 3 and that is used to store an instruction), and receive a next instruction fetch address or acquire, through computation, a next instruction fetch address based on an instruction fetch algorithm. The instruction fetch algorithm includes, for example, progressively incrementing an address or progressively decrementing an address based on an instruction length.

After the instruction is fetched, the scheduling unit 220 enters an instruction decoding stage. The instruction decoding unit 224 decodes the fetched instruction according to a predetermined instruction format to acquire operand acquisition information required for the fetched instruction, to prepare for an operation of the instruction execution unit 226. The operand acquisition information points to, for example, an immediate, a register, or other software/hardware that can provide a source operand.

The instruction transmission unit 225 is located between the instruction decoding unit 224 and the instruction execution unit 226, and is adapted to schedule and control instructions, to efficiently allocate the instructions to different instruction execution units 226, and make parallel operations of a plurality of instructions possible.

After the instruction transmission unit 225 transmits the instruction to the instruction execution unit 226, the instruction execution unit 226 starts to execute the instruction. However, if the instruction execution unit 226 determines that the instruction should be executed by an acceleration unit, the instruction execution unit 226 forwards the instruction to a corresponding acceleration unit for execution. For example, if the instruction is a neural network inference (inference) instruction, the instruction execution unit 226 no longer executes the instruction, but sends the instruction to the acceleration unit 230 through the bus, and the acceleration unit 230 executes the instruction.

The acceleration unit 230 includes a plurality of cores 236 (FIG. 3 illustrates four cores, but those skilled in the art should understand that the acceleration unit 230 may alternatively include another quantity of cores 236), a command processor 237, a direct memory access mechanism 235, and a bus channel 231.

The bus channel 231 is a channel through which an instruction enters and exits the acceleration unit 230 from the bus.

The direct memory access (DMA, Direct Memory Access) mechanism 235 includes some functions provided by a computer bus architecture, and enables data to be directly written from an auxiliary device to a memory of a computer motherboard. Compared with a manner in which all data between devices needs to be transmitted by using a scheduling unit, this manner greatly improves data access efficiency. Because of this mechanism, the cores of the acceleration unit 230 can directly access the memory 210 and read the parameter (for example, the weight of each node) or the like in the neural network model, thereby greatly improving data access efficiency.

The command processor 237 allocates, to the cores 236 for execution, the instruction sent by the scheduling unit 220 to the acceleration unit 230. The instruction execution unit 226 sends, to the acceleration unit 230, a to-be-executed instruction sequence that needs to be executed by the acceleration unit 230. After the to-be-executed instruction sequence enters the acceleration unit 230 through the bus channel 231, the to-be-executed instruction sequence is cached in the command processor 237, and the command processor 237 selects a core 236, and allocates the instruction sequence to the core 236 for execution. The embodiments of the present disclosure are mainly performed in the command processor 237. In the embodiment of the present disclosure, before allocating the to-be-executed instruction sequence to the cores 236 for execution, the command processor 237 further adds some instructions required for cross-core copy to appropriate locations in the to-be-executed instruction sequence, and allocates the instructions to a primary core; and also generates some instructions required for cross-core copy for a secondary core, and allocates the instructions to the secondary core. During actual execution of the to-be-executed instruction sequence, the instructions collaborate with the instructions allocated to the primary core to jointly perform cross-core copy. In addition, the command processor 237 is further responsible for a synchronization operation between the cores 236.

Acceleration-Unit Core

Figure 4:
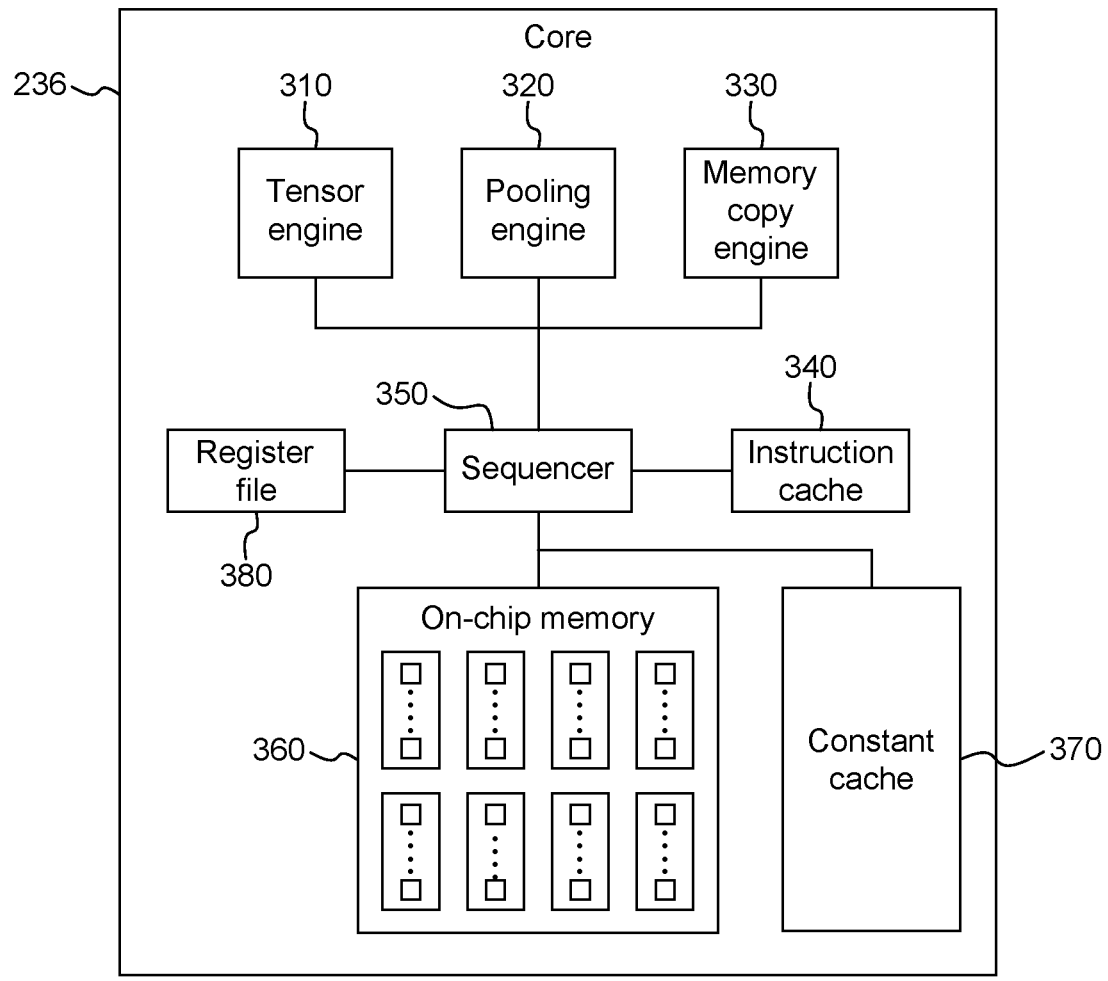
FIG. 4 is an internal structural diagram of an acceleration-unit core according to an embodiment of the present disclosure.

FIG. 4 is an internal structural diagram of an acceleration-unit core according to an embodiment of the present disclosure.

In an embodiment, as shown in FIG. 4, the acceleration-unit core 236 includes a tensor engine 310, a pooling engine 320, a memory copy engine 330, a sequencer 350, an instruction cache 340, an on-chip memory 360, a constant cache 370, and a register file 380.

The register file 380 may include a plurality of registers for storing different types of data and/or instructions, and the registers may be of different types. For example, the register file 380 may include an integer register, a floating-point register, a status register, an instruction register, and a pointer register. The registers in the register file 380 may be implemented by general-purpose registers, or a specific design may be used according to an actual requirement.

An instruction sequence allocated by the command processor 237 to the acceleration unit core 236 first enters the instruction cache 340 for caching. Then the sequencer 350 fetches an instruction from the instruction cache 340 in a first-in first-out order, and allocates the instruction to the tensor engine 310 or the pooling engine 320 for execution based on a nature of the instruction. The tensor engine 310 is responsible for processing related operations such as convolution and matrix multiplication in the neural network model. The pooling engine 320 is responsible for processing a pooling operation in the neural network model. The sequencer 350 decides whether to allocate the instruction to the tensor engine 310 or the pooling engine 320 based on an operational nature of the fetched instruction, for example, convolution, matrix multiplication, or pooling. In addition, in the embodiments of the present invention, the command processor 237 adds a cross-core copy instruction to the to-be-executed instruction sequence before the to-be-executed instruction sequence is actually allocated to the cores 236. If the sequencer 350 finds that the instruction fetched from the instruction cache 340 is a cross-core copy instruction, the sequencer 350 allocates the instruction to the memory copy engine 330 for processing. The memory copy engine 330 is a unit that specially processes cross-core data copy. In addition, to successfully perform cross-core copy, as described in detail below, the command processor 237 may further add synchronization primitive instructions to some locations in the to-be-executed instruction sequence. Because the command processor 237 is a unit responsible for synchronization between the cores 236, if the sequencer 350 finds that the instruction fetched from the instruction cache 340 is a synchronization primitive instruction, the sequencer 350 requests the command processor 237 to perform inter-core synchronization. If the command processor 237 receives a primary core synchronization primitive instruction from the primary core and a secondary core synchronization primitive instruction from the secondary core, the command processor 237 follows the two instructions to synchronize processing of the primary core and the secondary core.

The on-chip memory 360 is an intra-core memory that stores a weight parameter in the neural network model, and input and various intermediate results during actual use of the neural network model. The constant cache 370 is a cache that stores constant parameters (for example, hyperparameters in the neural network model) other than the weight parameter in the neural network model. As described above, in a process in which the scheduling unit 220 preconfigures the neural network model in the acceleration unit 230, the scheduling unit 220 sends addresses, in the memory 210, of parameters in the model to the acceleration unit 230 in a form of an instruction. The parameters include a weight of a node and other parameters (such as hyperparameters). For the weight, in an actual computation of the neural network model, the acceleration unit 230 fetches the weight from a corresponding location in the memory 210 and places the weight in the on-chip memory 360. For the other parameters, in an actual computation of the neural network model, the acceleration unit 230 fetches the parameters from corresponding locations in the memory 210 and places the parameters in the constant cache 370. In addition, when an instruction for actually starting inference (inference) is allocated by the command processor 237 to the cores 236 for execution, an input parameter (input to the neural network model) in the instruction is also stored in the on-chip memory 360. In addition, after the tensor engine 310 and the pooling engine 320 perform a convolution or pooling computation, various intermediate results acquired are also stored in the on-chip memory 360.

Figure 5:
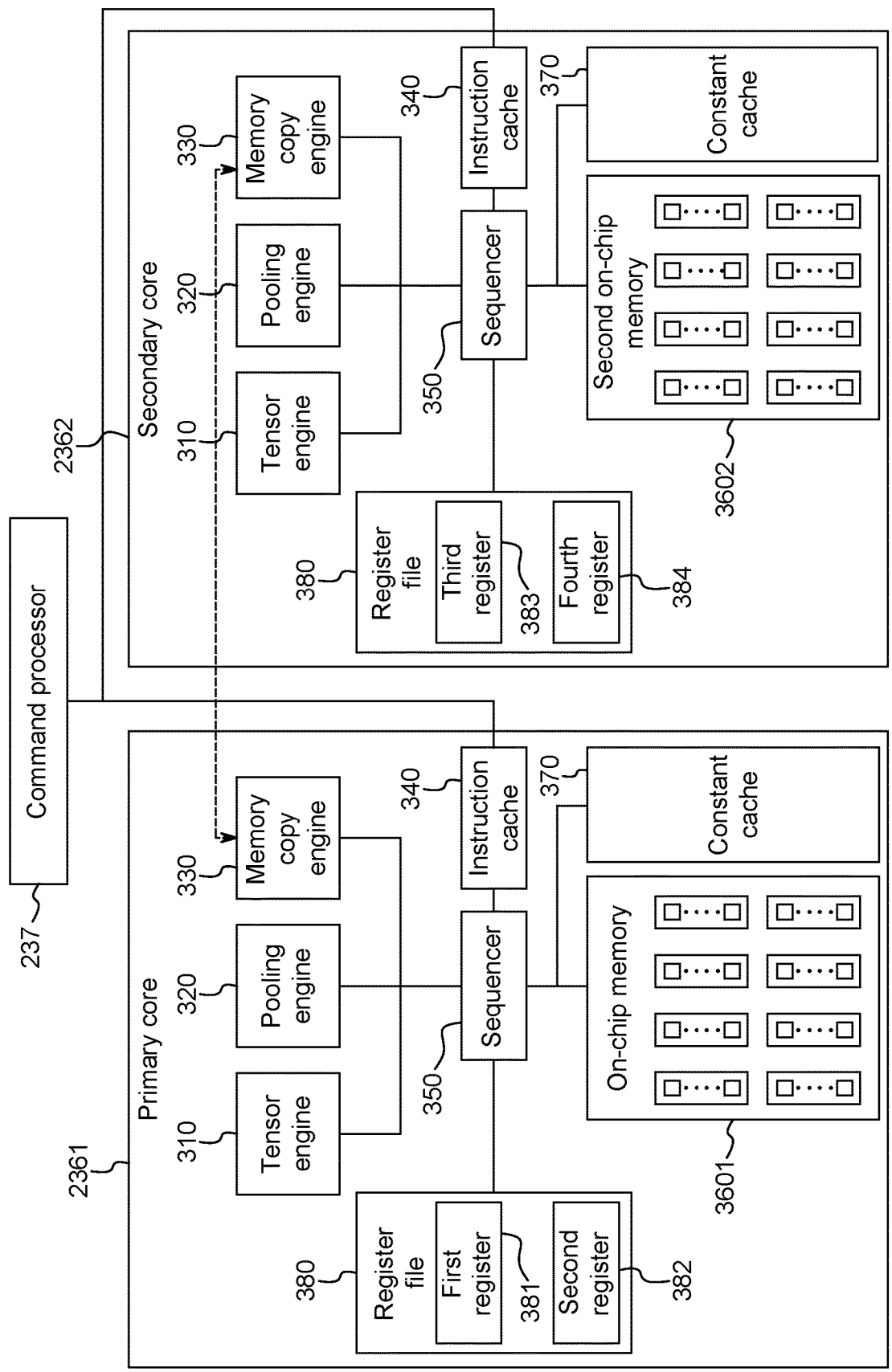
FIG. 5 is a schematic diagram of copying data between a primary core and a secondary core according to an embodiment of the present disclosure.

As shown in FIG. 5, the cores 236 may be classified into a primary core 2361 and a secondary core 2362. The primary core 2361 is a core that is in an acceleration unit and that is adapted to execute a to-be-executed instruction sequence to perform a series of entity operations or computations. The secondary core 2362 is a core that is in an acceleration unit and that is not adapted to perform entity operations or computations but only collaborates with the primary core 2361 to: when an on-chip memory of the primary core 2361 cannot accommodate an operand required for running an instruction sequence, temporarily store the operand that cannot be accommodated for the primary core 2361, and copy the operand back to a core of the on-chip memory of the primary core 2361 when the on-chip memory of the primary core 2361 can accommodate the operand.

It should be noted that the primary core and the secondary core herein are merely intended for convenience of description, and a differentiation thereof is not absolute. For a to-be-executed instruction sequence, a core allocated to execute the to-be-executed instruction sequence is a primary core for the to-be-executed instruction sequence, and a core that temporarily accommodates an operand for the primary core is a secondary core. However, for another to-be-executed instruction sequence, a case may be opposite.

When a sequencer 350 of the primary core 2361 finds that an instruction fetched from an instruction cache 340 of the primary core 2361 is a cross-core copy instruction to the secondary core 2362, a memory copy engine 330 of the primary core 2361 communicates with a memory copy engine 330 of the secondary core 2362, to copy, to a second on-chip memory 3602 of the secondary core 2362 by using the memory copy engine 330 of the secondary core, an operand that is in a first on-chip memory 3601 of the primary core 2361 and that needs to be transferred.

When a sequencer 350 of the secondary core 2362 finds that an instruction fetched from an instruction cache 340 of the secondary core 2362 is a cross-core copy instruction to the primary core 2361, the memory copy engine 330 of the secondary core 2362 communicates with the memory copy engine 330 of the primary core 2361, to copy, to the first on-chip memory 3601 of the primary core 2361 by using the memory copy engine 330 of the primary core, an operand that is in the second on-chip memory 3602 of the primary core 2361 and that needs to be transferred.

Prior-Art Operands Transfer Policy when an On-Chip Memory has an Insufficient Capacity With reference to FIG. 6A and FIG. 6B, the following describes a prior-art operand transfer policy when it is found during compilation by a compiler that an on-chip memory may be insufficient when an instruction sequence is executed.

FIG. 6A illustrates a to-be-executed instruction sequence. When the instruction execution unit 226 of the scheduling unit 220 determines that the to-be-executed instruction sequence is an instruction sequence (for example, an inferred instruction sequence for the neural network model) that needs to be executed by the acceleration unit 230, the instruction execution unit 226 sends the to-be-executed instruction sequence to the bus channel 231, and the instruction sequence finally enters the command processor 237. The command processor 237 first examines each instruction in the instruction sequence from front to back, and successively determines whether execution of the instruction will cause a quantity of operands currently required for the instruction sequence to exceed a maximum allowed quantity of stored operands in the on-chip memory, thereby causing an overflow. When it is determined that the foregoing overflow will occur when an instruction is executed, it is assumed that an operand newly introduced by the instruction is a second operand 402. Because the operand needs to be placed in the on-chip memory, an operand needs to be squeezed out and placed in a memory (not shown in FIG. 3) shared by the plurality of acceleration-unit cores in the acceleration unit. Usually, a least costly operand is selected from existing operands in the on-chip memory and squeezed out. A selection algorithm is, for example, a linear scan or greedy allocator algorithm. The selected and squeezed-out operand is a first operand 401. In FIG. 6B, the second operand 402 is an operand in an address r7, and the first operand 401 is an operand in an address r1.

Then the command processor 237 adds an external memory storage instruction store MEM, r1 to a first location 410 in the instruction sequence. This means moving the first operand 401 in the selected address r1 to an external memory, that is, the memory (not shown in FIG. 3) shared by the plurality of acceleration-unit cores in the acceleration unit. The first location 410 is after an instruction in which the first operand 401 appears for the last time before the second operand 402 appears. A reason is that, in the on-chip memory, the second operand 402 is used to replace the first operand 401, and the first operand 401 needs to be removed before the second operand 402 needs to be used. Therefore, a last instruction including the first operand 401 needs to be found before the second operand 402 appears, and the first operand 401 is transferred to the external memory from a location after the instruction. Because there is no instruction for the first operand 401 after this and before the second operand 402 appears, normal execution of the instruction sequence is not affected.

Then the command processor 237 adds an external memory download instruction load r1, MEM to the second location 420 in the instruction sequence. This means moving the first operand 401 in the address r1 back to the on-chip memory. The second location 420 is after an instruction in which the second operand 402 appears for the last time and before an instruction in which the first operand 401 appears for the first time. A reason is that, after the instruction in which the second operand 402 appears for the last time, the second operand 402 is no longer used, and may be removed from the on-chip memory; and the instruction in which the first operand appears for the first time after the instruction in which the second operand 402 appears for the last time is a location at which the first operand 401 is required again, and the first operand 401 needs to be recalled before the instruction so that the instruction can be successfully executed.

After the command processor 237 adds the instructions, the instruction sequence in FIG. 6A is changed to an instruction sequence in FIG. 6B. Then the command processor 237 allocates the instruction sequence in FIG. 6B to the acceleration-units core for execution.

Adding Related Instructions for Cross-Core Copy in Embodiments of the Present Disclosure The embodiments of the present disclosure, after receiving, from the scheduling unit 220, the to-be-executed instruction sequence (for example, an instruction related to a neural network computation) that needs to be executed by the acceleration unit 230, the command processor 237 of the acceleration unit 230 does not directly allocate the to-be-executed instruction sequence to cores, but adds various primary core executable statements (for example, 411, 412, 413, 414, 421, and 422 in FIG. 6C) required for cross-core copy to appropriate locations in the to-be-executed instruction sequence and allocates the instructions to the primary core 2361 for execution, and allocates various secondary core executable statements (for example, 511, 512, 513, 514, 521, and 522 in FIG. 6C) required for cross-core copy to the secondary core 2362, so that the statements collaborate with each other to jointly perform cross-core copy during actual execution of the to-be-executed instruction sequence.

Figure 6C:
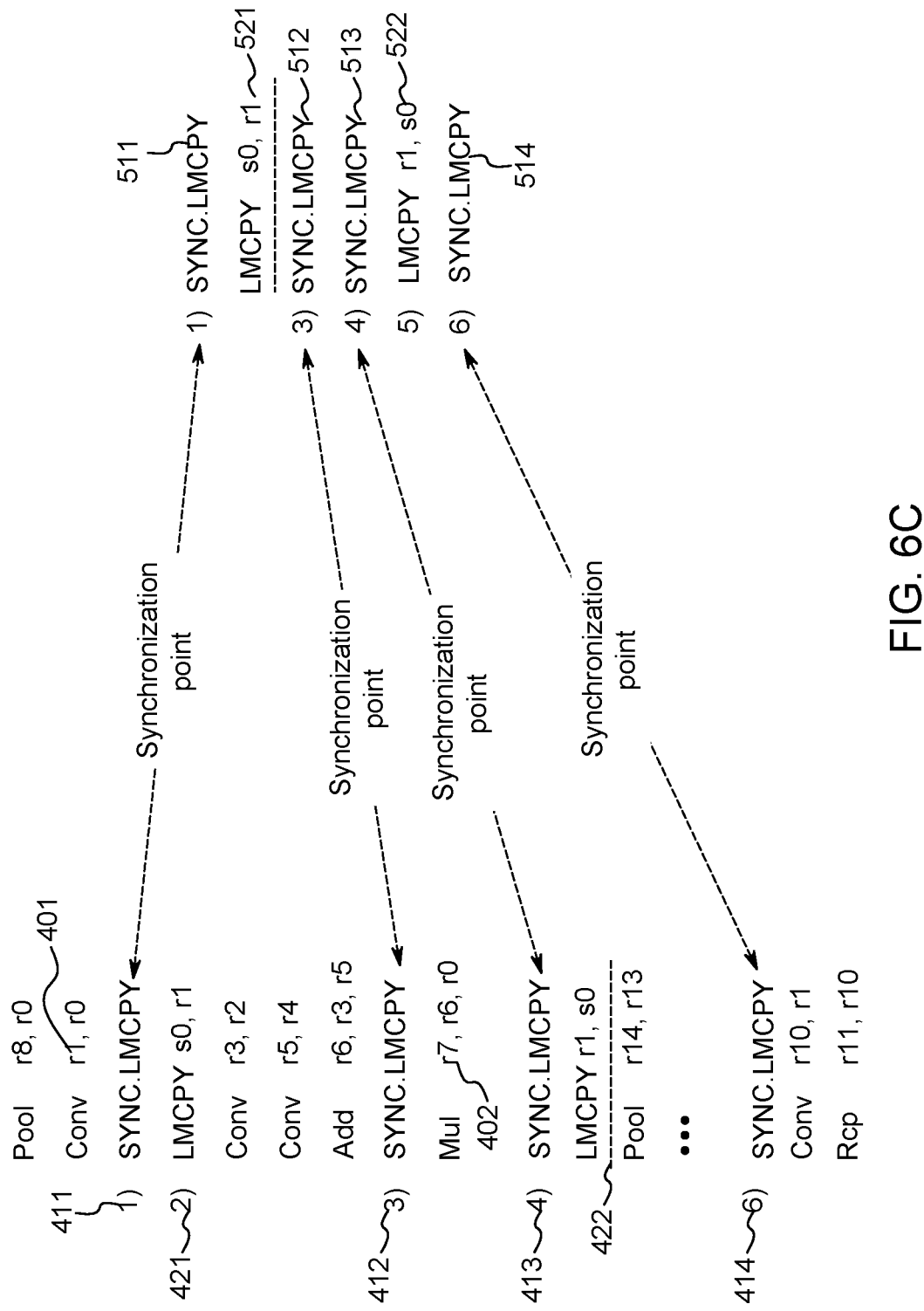
FIG. 6C illustrates an instruction to be used by a primary core and an instruction to be used by a secondary core during cross-core copy that are added to a to-be-executed instruction sequence according to an embodiment of the present disclosure.

With reference to FIG. 6C, the following describes in detail a process of adding related instructions for cross-core copy when the command processor 237 finds that the on-chip memory may be insufficient during execution of an instruction sequence in the embodiments of the present disclosure. The instructions on a left side of FIG. 6C are all instructions that are added to a to-be-executed instruction sequence and that need to be allocated to the acceleration-unit primary core 2361 for execution. Instructions on a right side of FIG. 6C are all instructions that need to be allocated to the acceleration-unit secondary core 2362 for execution.

The to-be-executed instruction sequence in FIG. 6A is stilled used as an example. Similar to FIG. 6B, the command processor 237 determines an instruction that may cause a quantity of operands currently required for the instruction sequence to exceed a maximum allowed quantity of stored operands in the on-chip memory, thereby causing an overflow, so as to locate a second operand 402 that is to cause the first on-chip memory 3601 to overflow when the instruction sequence is executed. Similar to FIG. 6B, the command processor 237 also determines a first operand 401 with a smallest cost after being removed. The second operand 402 is still an operand in the address r7, and the first operand 401 is still an operand in the address r1.

Then the command processor 237 adds a first cross-core copy instruction 421, that is, LMCPY s0, r1, to a first position in the to-be-executed instruction sequence. The instruction instructs to use a first register 381 in a register file 380 of the primary core 2361 as a source copy address r1, which indicates an address, in the first on-chip memory 3601, of the first operand 401 that needs to be moved to the acceleration-unit secondary core 2362. The instruction instructs to use a second register 382 in the register file 380 of the primary core 2361 as a destination copy address s0, which indicates an address, in the second on-chip memory 3602 of the acceleration-unit secondary core 2362, to which the first operand 401 needs to be moved. When actually executing the instruction, the primary core 2361 fetches the source copy address r1 from the first register 381, fetches the destination copy address s0 from the second register 382, acquires the first operand 401 in the source copy address r1 from the first on-chip memory 3601, and copies the acquired first operand 401 to the destination copy address s0 in the second on-chip memory 3602 of the acceleration-unit secondary core 2362.

In an embodiment, the first location 410 may be after an instruction in which the first operand 401 is used for the last time before the second operand 402 appears. A reason is that the first operand 401 needs to be transferred from the first on-chip memory 3601 before the second operand 402 is used, so that the second operand 402 can be placed in the first on-chip memory 3601. Therefore, a last instruction including the first operand 401 needs to be found before the second operand 402 appears, and the first operand 401 is transferred to the second on-chip memory 3602 of the acceleration-unit secondary core 2362 from a location after the instruction. Because there is no instruction for the first operand 401 after this and before the second operand 402 appears, normal execution of the instruction sequence is not affected. The first location 410 is after an instruction cony r1, r0 in which r1 is used for the last time before r7 appears for the first time.

The command processor 237 may insert a first primary core synchronization primitive instruction 411, that is, SYNC.LMCPY, before a first cross-core copy instruction 421 inserted in the to-be-executed instruction sequence. Symmetrically, a first secondary core synchronization primitive instruction 511, that is, SYNC.LMCPY, is allocated to the secondary core 2362.

Significance of synchronization is to ensure a consistent execution progress between cores. Progresses of executing instructions by two cores are inconsistent. When one core finishes executing an instruction, the other core may be executing another instruction. Synchronization means waiting for the other core to finish execution so that the two cores simultaneously start to execute their subsequent instructions. Therefore, in the embodiments of the present disclosure, the first cross-core copy instruction 421 is inserted. When the primary core 2361 performs copy for the first cross-core copy instruction 421, if the secondary core 2362 is performing another action, a copy error may occur. Therefore, the first primary core synchronization primitive instruction 411 is inserted in front, and the first secondary core synchronization primitive instruction 511 is allocated to the secondary core 2362. During synchronization, the first primary core synchronization primitive instruction 411 and the first secondary core synchronization primitive instruction 511 are executed in collaboration with each other. In this way, after the execution is completed, when the first cross-core copy instruction 421 is executed, the secondary core 2362 has just finished executing the first secondary core synchronization primitive instruction 511, and is not occupied by another instruction, so that no error occurs in cross-core copy.

The command processor 237 may allocate a first dumb cross-core copy instruction 521, that is, LMCPY s0, r1 marked by a dashed line on the right side of FIG. 6C, to the secondary core 2362 after the first secondary core synchronization primitive instruction 511. The first dumb cross-core copy instruction 521 is not required, and is ignored and not executed during execution. A function of the first dumb cross-core copy instruction 521 is to meet a requirement in some acceleration units that a synchronization implementation mechanism needs to ensure that synchronization primitive instructions of a plurality of acceleration-unit cores need to be followed by a same quantity of LMCPY instructions. However, some acceleration units do not have this requirement. Therefore, the first dumb cross-core copy instruction 521 is an optional instruction.

The command processor 237 may insert a second primary core synchronization primitive instruction 412, that is, SYNC.LMCPY, at a location before an instruction in which the second operand 402 appears in the to-be-executed instruction sequence for the first time. Correspondingly, a second secondary core synchronization primitive instruction 512, that is, SYNC.LMCPY, is allocated to the secondary core 2362.

Inserting the second primary core synchronization primitive instruction 412 at the location before the instruction in which the second operand 402 appears in the to-be-executed instruction sequence for the first time is to ensure that the first operand 401 has been safety copied to the second on-chip memory 3602 of the acceleration-unit secondary core 2362 before the second operand 402 is actually used. Operand copy requires a process. The first cross-core copy instruction 411 has been placed at the first location to copy the first operand 401 to the second on-chip memory 3602. However, because operand copy takes time, the copy may have not been completed when the instruction sequence is executed to the location before the instruction in which the second operand 402 appears in the to-be-executed instruction sequence for the first time. It should be noted that the to-be-executed instruction sequence is allocated by the sequencer 350 to the tensor engine 310, the pooling engine 320, and the memory copy engine 330 for execution. Although instructions are fetched and allocated to each engine in an order from front to back, executions of engines are usually parallel, and execution times of the instructions are not necessarily the same as content of the instructions varies. As a result, execution of an instruction in front of a few instructions may have not be completed after the instructions are executed. The second primary core synchronization primitive instruction 412 is added to the to-be-executed instruction sequence, and the second secondary core synchronization primitive instruction 512 is allocated to the secondary core 2362, to implement synchronization between the acceleration-unit primary core 2361 and the acceleration-unit secondary core 2362. In this way, when the instruction in which the second operand 402 appears for the first time starts to be executed, it is ensured that execution of the first cross-core copy instruction has been completed, thereby avoiding a case in which copy of the first operand 401 is not completed and the first operand 401 is finally lost.

The command processor 237 may add a third primary core synchronization primitive instruction 413 and a second dumb cross-core copy instruction 422 after an instruction in which the second operand 402 appears in the to-be-executed instruction sequence for the last time. The third primary core synchronization primitive instruction 413 is SYNC.LMCPY, and the second dumb cross-core copy instruction 422 is LMCPY r1, s0 marked by a horizontal dashed line on the left side of FIG. 6C. In addition, the command processor 237 generates a third secondary core synchronization primitive instruction 513, that is, SYNC.LMCPY, for the secondary core 2362, and generates a second cross-core copy instruction 522, that is, LMCPY r1, s0 on the right side of FIG. 6C.

A reason of adding the third primary core synchronization primitive instruction 413 and the second dumb cross-core copy instruction 422 after the instruction in which the second operand 402 appears in the to-be-executed instruction sequence for the last time is that, after the instruction in which the second operand 402 appears in the instruction sequence for the last time, the second operand 402 is no longer used, and the second cross-core copy instruction 522 may be safely used to fetch the first operand 401 from the second on-chip memory 3602, and replace the second operand 402 in the first on-chip memory 3601. In this way, when an instruction using the first operand 401 appears subsequently, execution of the instruction is not affected. In FIG. 6C, the foregoing instructions are added after an instruction mul r7, r6, r0 in which r7 appears for the last time.

The second cross-core copy instruction 522, that is, LMCPY r1, s0 on the right side of FIG. 6C, instructs to use a third register 383 in a register file 380 of the secondary core 2362 as a source copy address s0, which indicates an address, in the second on-chip memory 3602, of the first operand 401 that needs to be moved back to the acceleration-unit primary core 2361. The instruction further instructs to use a fourth register 384 in the register file 380 of the secondary core 2362 as a destination copy address r1, which indicates an address, in the first on-chip memory 3601 of the acceleration-unit primary core 2361, to which the first operand 401 needs to be moved back. When actually executing the instruction, the secondary core 2362 fetches the source copy address s0 from the third register 383, fetches the destination copy address r1 from the fourth register 384, acquires the first operand 401 in the source copy address s0 from the second on-chip memory 3602, and copies the acquired first operand 401 to the destination copy address r1 in the first on-chip memory 3601 of the acceleration-unit primary core 2361.

A reason why the command processor 237 generates the third secondary core synchronization primitive instruction 513 for the secondary core 2362 before generating the second cross-core copy instruction 522 for the secondary core 2362, and symmetrically inserts the third primary core synchronization primitive instruction 413 in the to-be-executed instruction sequence is that, the two synchronization primitive instructions are used to ensure a consistent execution progress between the primary core 2361 and the secondary core 2362, that is, if one core has finished executing an instruction but the other core has not finished executing an instruction that is being executed, waiting for the other core to finish execution so that the two cores simultaneously start to execute their subsequent instructions. As described above, the second cross-core copy instruction 522 is generated for the secondary core 2362. When the secondary core 2362 performs copy for the second cross-core copy instruction 522, if the primary core 2361 is performing another action, a copy error may occur. Therefore, the third secondary core synchronization primitive instruction 513 is generated for the secondary core 2362, and the third primary core synchronization primitive instruction 413 is inserted in the to-be-executed instruction sequence. During synchronization, the two synchronization primitive instructions are executed in collaboration with each other. In this way, after the execution is completed, when the second cross-core copy instruction 522 is executed, the primary core 2361 has just finished executing the third primary core synchronization primitive instruction 413, and is not occupied by another instruction, so that no error occurs in cross-core copy.

The second dumb cross-core copy instruction 422 added after the third primary core synchronization primitive instruction 413 is not required, and is ignored and not executed during execution. A function of the second dumb cross-core copy instruction 422 is to meet a requirement in some acceleration units that a synchronization implementation mechanism needs to ensure that synchronization primitive instructions of a plurality of acceleration-unit cores need to be followed by a same quantity of LMCPY instructions. However, some acceleration units do not have this requirement. Therefore, the second dumb cross-core copy instruction 422 is an optional instruction.

The command processor 237 may add a fourth primary core synchronization primitive instruction 414, that is, SYNC.LMCPY, before an instruction in which the first operand 401 is used for the first time after the second operand 402 appears in the to-be-executed instruction sequence for the last time. Correspondingly, a fourth secondary core synchronization primitive instruction 514, that is, SYNC.LMCPY, is allocated to the secondary core 2362.

Adding the fourth primary core synchronization primitive instruction 414 before the instruction in which the first operand 401 is used for the first time after the second operand 402 appears in the instruction sequence for the last time is to ensure that the first operand 401 has been safety copied back to the first on-chip memory 3601 of the acceleration-unit primary core 2361 before the first operand 401 starts to be used again. Operand copy requires a process. As described above, the second cross-core copy instruction has been generated for the secondary core 2362 to copy the first operand 401 back to the first on-chip memory 3601. However, because operand copy takes time, the copy may have not been completed when the instruction sequence is executed to a location of the instruction in which the first operand 401 is used for the first time after the second operand 402 appears in the to-be-executed instruction sequence for the last time. This problem can be avoided by adding a synchronization primitive instruction to each of the acceleration-unit primary core 2361 and the acceleration-unit secondary core 2362. With the instruction, synchronization is implemented between the acceleration-unit primary core 2361 and the acceleration-unit secondary core 2362. In this way, when the instruction in which the first operand 401 appears again starts to be executed, it is ensured that execution of the second cross-core copy instruction has been completed, thereby avoiding a case in which the first operand 401 starts to be used before copy of the first operand 401 is completed.

Although FIG. 5 shows only one secondary core 2362, those skilled in the art should understand that there may be alternatively a plurality of secondary cores 2362. When there are a plurality of secondary cores 2362, the first cross-core copy instruction is used to copy the first operand from the first on-chip memory 3601 to a second on-chip memory 3602 of a selected secondary core 2362 in the plurality of secondary cores 2362, and the second cross-core copy instruction is used to copy the first operand from the second on-chip memory 3602 of the selected secondary core 2362 back to the first on-chip memory 3601. The secondary core 2362 may be selected by using a plurality of methods. In an embodiment, the selected secondary core 2362 is selected from the plurality of secondary cores 2362 based on a distance from each of the plurality of secondary cores 2362 to the primary core. An advantage of selecting the secondary core 2362 in this way is that a transmission distance during copy can be reduced, thereby improving efficiency of cross-core copy.

Actual Execution of the Related Instructions for Cross-Core Copy

In the embodiments of the present disclosure, cross-core copy is mainly to: when it is determined that the first on-chip memory 3601 of the acceleration-unit primary core 2361 may overflow, transfer an operand that needs to be transferred from the first on-chip memory 3601 to the second on-chip memory 3602 of the acceleration-unit secondary core 2362; and when no overflow occurs, transfer the operand from the second on-chip memory 3602 back to the first on-chip memory 3601. Therefore, an execution procedure of the foregoing main implementation process is first described.

As shown in FIG. 5, the register file 380 of the acceleration-unit primary core 2361 includes the first register 381 and the second register 382 adapted to store the first address and the second address respectively. After the instruction cache 340 of the acceleration-unit primary core 2361 receives a to-be-executed instruction sequence in which various instructions required for performing cross-core copy have been inserted by the command processor 237, the primary core sequencer 350 sequentially fetches the instructions from the instruction cache 340 for decoding. When the first cross-core copy instruction 421, that is, LMCPY s0, r1, is fetched, the first cross-core copy instruction 421 uses the first address in the first register 381 as the source address r1 for cross-core copy, and uses the second address in the second register 382 as the destination address s0 for cross-core copy. The primary core sequencer 350 sends a decoded instruction to the memory copy engine 330 of the acceleration-unit primary core 2361 for execution. The primary core memory copy engine 330 receives and executes the decoded first cross-core copy instruction 421, fetches the first address used as the source address r1 from the first register 381, and fetches the second address used as the destination address s0 from the second register 382, to transfer the first operand in the source address r1 to the destination address s0 in the second on-chip memory 3602.

The register file 380 of the acceleration-unit secondary core 2362 includes the third register 383 and the fourth register 384 adapted to store the second address and the first address respectively. After the instruction cache 340 of the acceleration-unit secondary core 2362 receives instructions that need to be executed by the secondary core for cross-core copy and that are allocated by the command processor 237, the secondary core sequencer 350 sequentially fetches the instructions from the instruction cache 340 for decoding. When the second cross-core copy instruction 522, that is, LMCPY r1, s0, is fetched, the second cross-core copy instruction 522 uses the second address in the third register 383 as the source address s0 for cross-core copy, and uses the first address in the fourth register 384 as the destination address r1 for cross-core copy. The secondary core sequencer 350 sends a decoded instruction to the memory copy engine 330 of the acceleration-unit secondary core 2362 for execution. The memory copy engine 330 of the secondary core receives and executes the decoded second cross-core copy instruction 522, fetches the second address used as the source address s0 from the third register 383, and fetches the first address used as the destination address r1 from the fourth register 384, to transfer the first operand in the source address s0 back to the destination address r1 in the first on-chip memory 3601.

With the foregoing process, a cross-core copy process is generally implemented: when the first on-chip memory 3601 of the acceleration-unit primary core 2361 may overflow, transferring the first operand that needs to be transferred from the first on-chip memory 3601 to the second on-chip memory 3602 of the acceleration-unit secondary core 2362, and transferring the operand from the second on-chip memory 3602 back to the first on-chip memory 3601 when appropriate.

The foregoing process is only a rough cross-core copy process. In practice, to ensure that various types of data in the cross-core copy process are not lost, or ensure that execution of related instructions has been completed when cross-core copy is performed, to avoid a copy error, execution of synchronization primitive instructions further needs to be considered when various synchronization primitive instructions are received. The following describes in detail an execution process of various synchronization primitive instructions.

Before receiving and caching the first cross-core copy instruction 421, the primary core instruction cache 340 may receive and cache the first primary core synchronization primitive instruction 411, that is, SYNC.LMCPY, used to synchronize the acceleration-unit primary core 2361 and the acceleration-unit secondary core 2362. The primary core sequencer 350 decodes the cached first primary core synchronization primitive instruction 411, and sends a decoded first primary core synchronization primitive instruction 411 to the command processor 237.

The secondary core instruction cache 340 receives and caches the first secondary core synchronization primitive instruction 511, that is, SYNC.LMCPY, corresponding to the first primary core synchronization primitive instruction 411; and receives and caches the first dumb cross-core copy instruction 521 corresponding to the first cross-core copy instruction 421. The secondary core sequencer 350 decodes the cached first secondary core synchronization primitive instruction 511 and first dumb cross-core copy instruction 521, and sends a decoded first secondary core synchronization primitive instruction 511 to the command processor 237. In this way, the command processor 237 receives both the decoded first primary core synchronization primitive instruction 411 and the decoded first secondary core synchronization primitive instruction 511. According to the two instructions, the acceleration-unit primary core 2361 and the acceleration-unit secondary core 2362 may be synchronized. Significance of performing synchronization according to the primary core synchronization primitive instruction 411 and the first secondary core synchronization primitive instruction 511 is described in the foregoing descriptions of inserting the foregoing instructions in the to-be-executed instruction sequence by the command processor 237. Therefore, details are not described. As described above, the first dumb cross-core copy instruction 521 has no practical meaning, and therefore is not executed.

The primary core instruction cache 340 receives and caches the first primary core synchronization primitive instruction 411 after receiving and caching an instruction conv r1, r0 in which a first operand r1 is used for the last time before a second operand r7 appears in the to-be-executed instruction sequence. Significance of this is described in the foregoing descriptions of inserting the foregoing instructions in the to-be-executed instruction sequence by the command processor 237.

The primary core instruction cache 340 receives and caches the second primary core synchronization primitive instruction 412, that is, SYNC.LMCPY, before receiving and caching an instruction mul r7, r6, r0 in which the second operand r7 appears in the to-be-executed instruction sequence for the first time. A reason of receiving the second primary core synchronization primitive instruction 412 before mul r7, r6, r0 is described in the foregoing descriptions of inserting the foregoing instructions in the to-be-executed instruction sequence by the command processor 237. Then the primary core sequencer 350 decodes the cached second primary core synchronization primitive instruction 422, and sends a decoded second primary core synchronization primitive instruction 422 to the command processor 237.

After receiving and caching the first dumb cross-core copy instruction 521, the instruction cache 340 of the secondary core receives and caches the second secondary core synchronization primitive instruction 512 corresponding to the second primary core synchronization primitive instruction 412. The secondary core sequencer 350 decodes the cached second secondary core synchronization primitive instruction 512, and sends a decoded second secondary core synchronization primitive instruction 512 to the command processor 237. The command processor 237 receives both the second primary core synchronization primitive instruction 412 and the second secondary core synchronization primitive instruction 512, so that the primary core and the secondary core may be synchronized according to the two instructions. Significance of performing synchronization according to the second primary core synchronization primitive instruction 412 and the second secondary core synchronization primitive instruction 512 is described in the foregoing descriptions of inserting the foregoing instructions in the to-be-executed instruction sequence by the command processor 237. Therefore, details are not described.

The primary core instruction cache 340 sequentially receives the third primary core synchronization primitive instruction 413 and the second dumb cross-core copy instruction 422 corresponding to the second cross-core copy instruction 522 after receiving and caching an instruction mul r7, r6, r0 in which the second operand r7 appears in the to-be-executed instruction sequence for the last time. The third primary core synchronization primitive instruction 413 is SYNC.LMCPY, and the second dumb cross-core copy instruction 422 is LMCPY r1, s0. Significance of sequentially receiving the instructions after the instruction in which the second operand appears in the to-be-executed instruction sequence for the last time is described in the foregoing descriptions of inserting the foregoing instructions in the to-be-executed instruction sequence by the command processor 237. Therefore, details are not described.

The primary core sequencer 350 decodes the cached third primary core synchronization primitive instruction 413 and second dumb cross-core copy instruction 422, and sends a decoded third primary core synchronization primitive instruction 413 to the command processor 237. The second dumb cross-core copy instruction 422 is not to be executed, and therefore can be ignored.

Before receiving and caching the second cross-core copy instruction 522 and after receiving and caching the second secondary core synchronization primitive instruction 512, the secondary core instruction cache 340 receives and caches the third secondary core synchronization primitive instruction 513. The secondary core sequencer 350 decodes the cached third secondary core synchronization primitive instruction 513, and sends a decoded third secondary core synchronization primitive instruction 513 to the command processor 237. In this case, the command processor 237 receives both the third primary core synchronization primitive instruction 413 and the third secondary core synchronization primitive instruction 513, so that the acceleration-unit primary core 2361 and the acceleration-unit secondary core 2362 may be synchronized according to the two instructions. Significance of the synchronization is described in the foregoing descriptions of inserting the foregoing instructions in the to-be-executed instruction sequence by the command processor 237.

The primary core instruction cache 340 receives and caches the fourth primary core synchronization primitive instruction 414, that is, SYNC.LMCPY, before receiving and caching an instruction conv r10, r1 in which the first operand r1 is used for the first time after the second operand r7 appears in the to-be-executed instruction sequence for the last time. Significance of performing receiving and caching before the instruction conv r10, r1 in which the first operand r1 is used for the first time after the second operand r7 appears in the to-be-executed instruction sequence for the last time is described in the foregoing descriptions of inserting the foregoing instructions in the to-be-executed instruction sequence by the command processor 237. Therefore, details are not described.

The primary core sequencer 350 decodes the cached fourth primary core synchronization primitive instruction 414, and sends a decoded fourth primary core synchronization primitive instruction 414 to the command processor 237.

After receiving and caching the second cross-core copy instruction 522, the secondary core instruction cache 340 receives and caches the fourth secondary core synchronization primitive instruction 514, that is, SYNC.LMCPY, corresponding to the fourth primary core synchronization primitive instruction 414. The secondary core sequencer 350 decodes the cached fourth secondary core synchronization primitive instruction 514, and sends a decoded fourth secondary core synchronization primitive instruction 514 to the command processor 237. The command processor 237 receives both the fourth primary core synchronization primitive instruction 414 and the fourth secondary core synchronization primitive instruction 514, so that the acceleration-unit primary core 2361 and the acceleration-unit secondary core 2362 may be synchronized according to the two instructions. Significance of the synchronization is described in the foregoing descriptions of inserting the foregoing instructions in the to-be-executed instruction sequence. Therefore, details are not described.

The foregoing part focuses on describing execution of various instructions related to cross-core copy in terms of impact on the cross-core copy, and does not correspond to a chronological order. To be clearer about a chronological order in which the instructions are executed, the following describes the execution process of the related instructions for cross-core copy in the embodiments of the present disclosure with reference to FIG. 7A, FIG. 7B, FIG. 8A, and FIG. 8B.

Figure 7A:
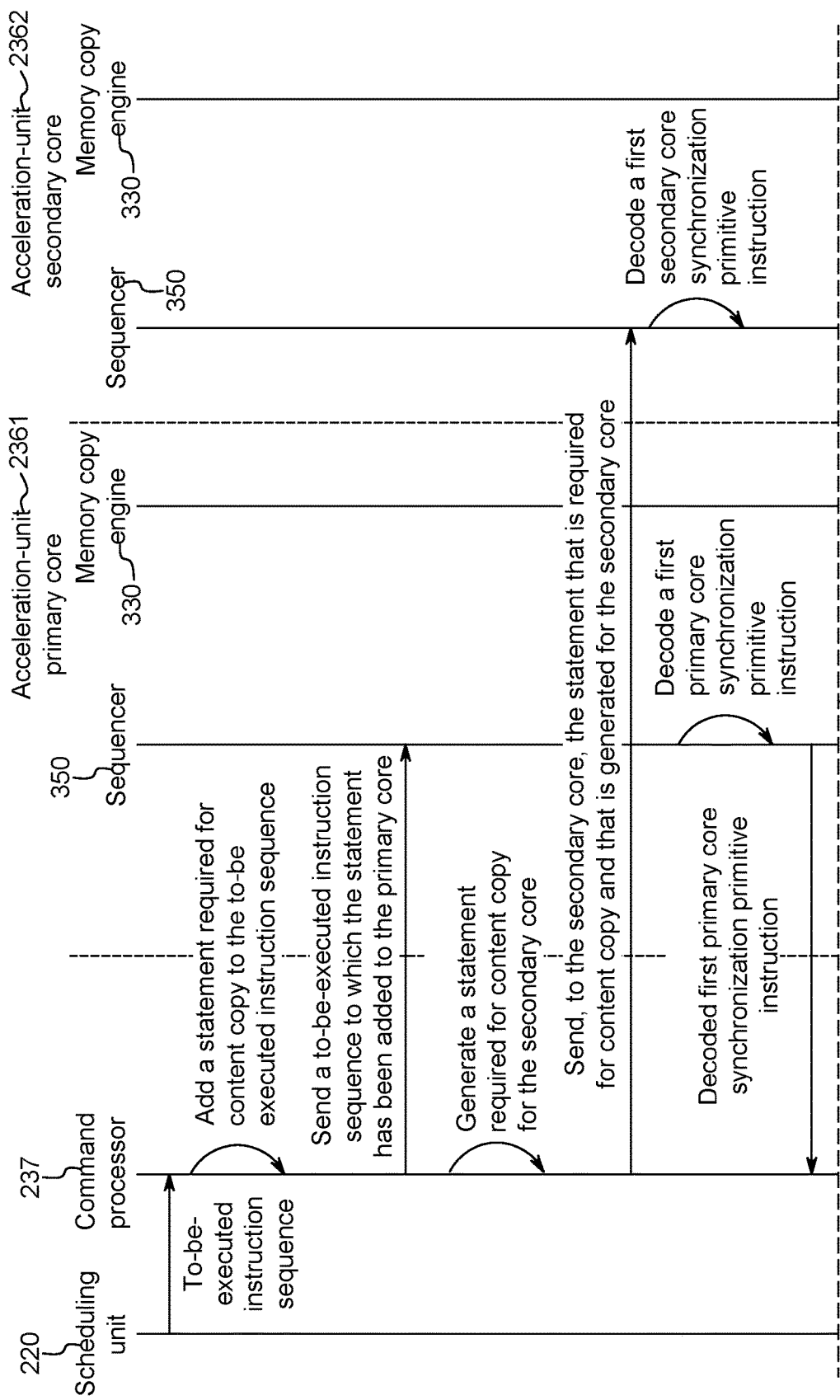
FIG. 7A, FIG. 7B, FIG. 8A, and FIG. 8B, illustrate an interaction flowchart of a cross-core copy method according to an embodiment of the present disclosure.
Figure 7B:
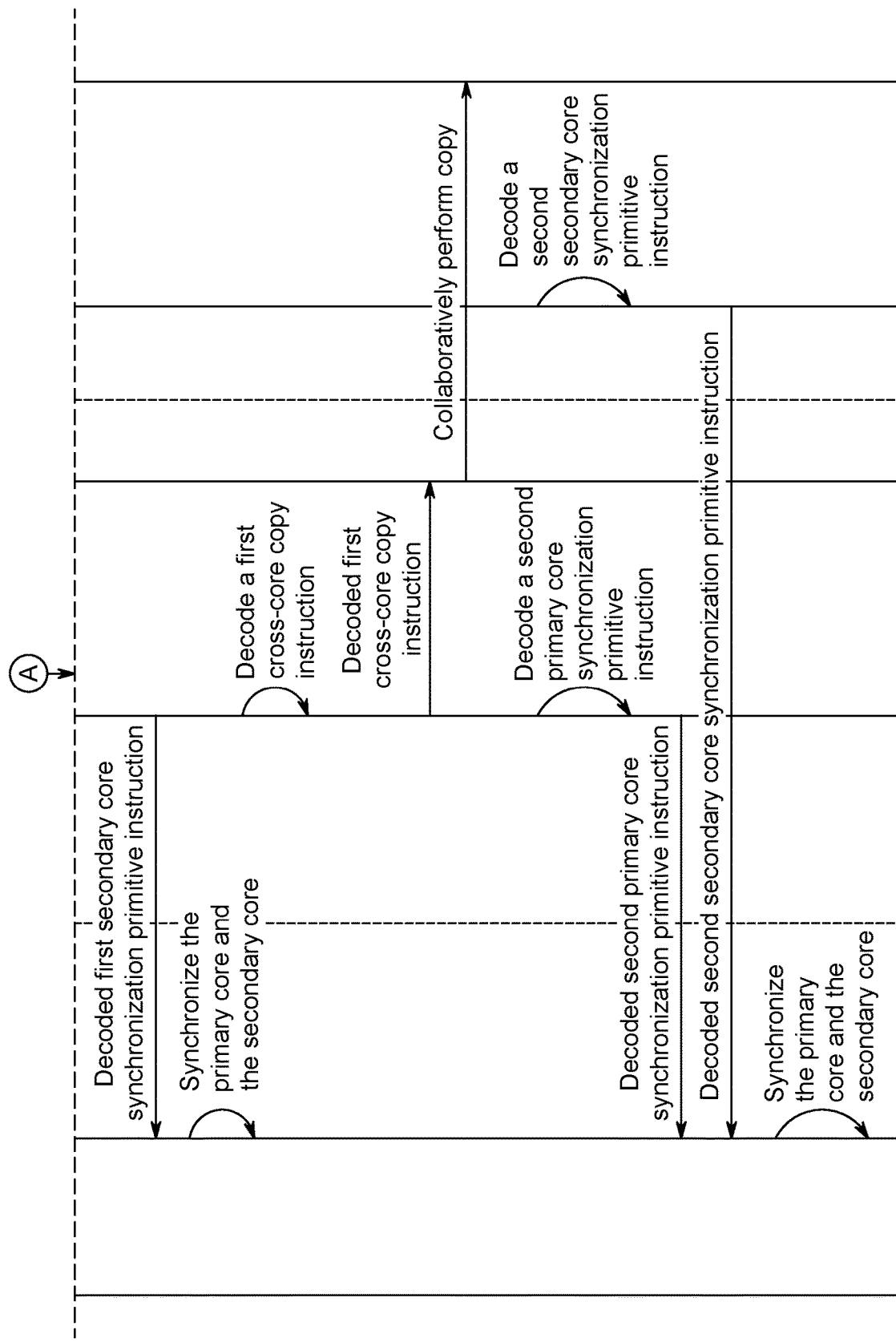

As shown in FIG. 7A and FIG. 7B, the scheduling unit 220 sends, to the acceleration unit 230, a to-be-executed instruction sequence that needs to be executed by the acceleration unit 230, and the to-be-executed instruction sequence enters the command processor 237 through the bus channel 231. The command processor 237 adds various primary core executable statements (for example, 411, 412, 413, 414, 421, and 422 in FIG. 6C) required for cross-core copy to appropriate locations in the to-be-executed instruction sequence and allocates the instructions to the primary core 2361 for execution, and allocates various secondary core executable statements (for example, 511, 512, 513, 514, 521, and 522 in FIG. 6C) required for cross-core copy to the secondary core 2362 for the secondary core 2362 to execute.

The instruction cache 340 of the primary core 2361 receives and caches a to-be-executed instruction sequence to which the command processor 237 has added the various primary core executable statements required for cross-core copy. The sequencer 350 of the primary core 2361 successively fetches an instruction from the instruction cache 340 in a first-in first-out order of the instruction cache 340, decodes the instruction, and decides whether to allocate the instruction to a tensor engine 310, a pooling engine 320, or a memory copy engine 330 of the primary core 2361 for execution.

The instruction cache 340 of the secondary core 2362 receives and caches the various secondary core executable statements required for cross-core copy that are sent by the command processor 237. Then the sequencer 350 of the secondary core 2362 fetches an instruction from the instruction cache 340 in a first-in first-out order of the instruction cache 340, decodes the instruction, and decides whether to allocate the instruction to a tensor engine 310, a pooling engine 320, or a memory copy engine 330 of the secondary core 236 for execution.

The instruction cache 340 of the primary core 2361 receives and caches the first primary core synchronization primitive instruction 411 after receiving and caching an instruction cony r1, r0 in which the first operand 401 is used for the last time before the second operand 402 appears in the to-be-executed instruction sequence. The sequencer 350 of the primary core 2361 decodes the cached first primary core synchronization primitive instruction 411, and sends a decoded first primary core synchronization primitive instruction 411 to the command processor 237 outside the primary core 2361.

The instruction cache 340 of the secondary core 2362 receives and caches the first secondary core synchronization primitive instruction 511. The sequencer 350 of the secondary core 2362 decodes the cached first secondary core synchronization primitive instruction 511, and sends a decoded first secondary core synchronization primitive instruction 511 to the command processor 237 outside the secondary core 236.

The command processor 237 synchronizes the primary core 2361 and the secondary core 2362 according to the decoded first primary core synchronization primitive instruction 411 and the decoded first secondary core synchronization primitive instruction 511.

Then the instruction cache 340 of the primary core 2361 receives and caches the first cross-core copy instruction 421, that is, LMCPY s0, r1, inserted in the to-be-executed instruction sequence. The sequencer 350 of the primary core 2361 decodes the cached first cross-core copy instruction 421, and sends a decoded first cross-core copy instruction 421 to the memory copy engine 330. The first cross-core copy instruction 421 instructs to use the first address in the first register 381 as the source address r1 for cross-core copy, and use the second address in the second register 382 as the destination address s0 for cross-core copy. The memory copy engine 330 of the primary core transfers the first operand in the first address used as the source address to the second address used as the destination address.

In addition, the instruction cache 340 of the secondary core 2362 receives and caches the first dumb cross-core copy instruction 521, that is, LMCPY s0, r1 marked by the dashed line on the right side of FIG. 6C, inserted in the to-be-executed instruction sequence. The sequencer 350 of the secondary core 2362 decodes the cached first dumb cross-core copy instruction 521, finds that the first dumb cross-core copy instruction 521 is a dumb cross-core copy instruction, and does not process the first dumb cross-core copy instruction 521.

Then the instruction cache 340 of the primary core 2361 receives and caches the second primary core synchronization primitive instruction 412 before receiving and caching an instruction mul r7, r6, r0 in which the second operand 402 appears in the to-be-executed instruction sequence for the first time. The sequencer 350 of the primary core 2361 decodes the cached second primary core synchronization primitive instruction 412, and sends a decoded second primary core synchronization primitive instruction 412 to the command processor 237 outside the primary core 2361.

The instruction cache 340 of the secondary core 2362 receives and caches the second secondary core synchronization primitive instruction 512. The sequencer 350 of the secondary core 2362 decodes the cached second secondary core synchronization primitive instruction 512, and sends a decoded second secondary core synchronization primitive instruction 512 to the command processor 237 outside the secondary core 2362.

The command processor 237 synchronizes the primary core 2361 and the secondary core 2362 according to the decoded second primary core synchronization primitive instruction 412 and the decoded second secondary core synchronization primitive instruction 512.

Figure 8A:
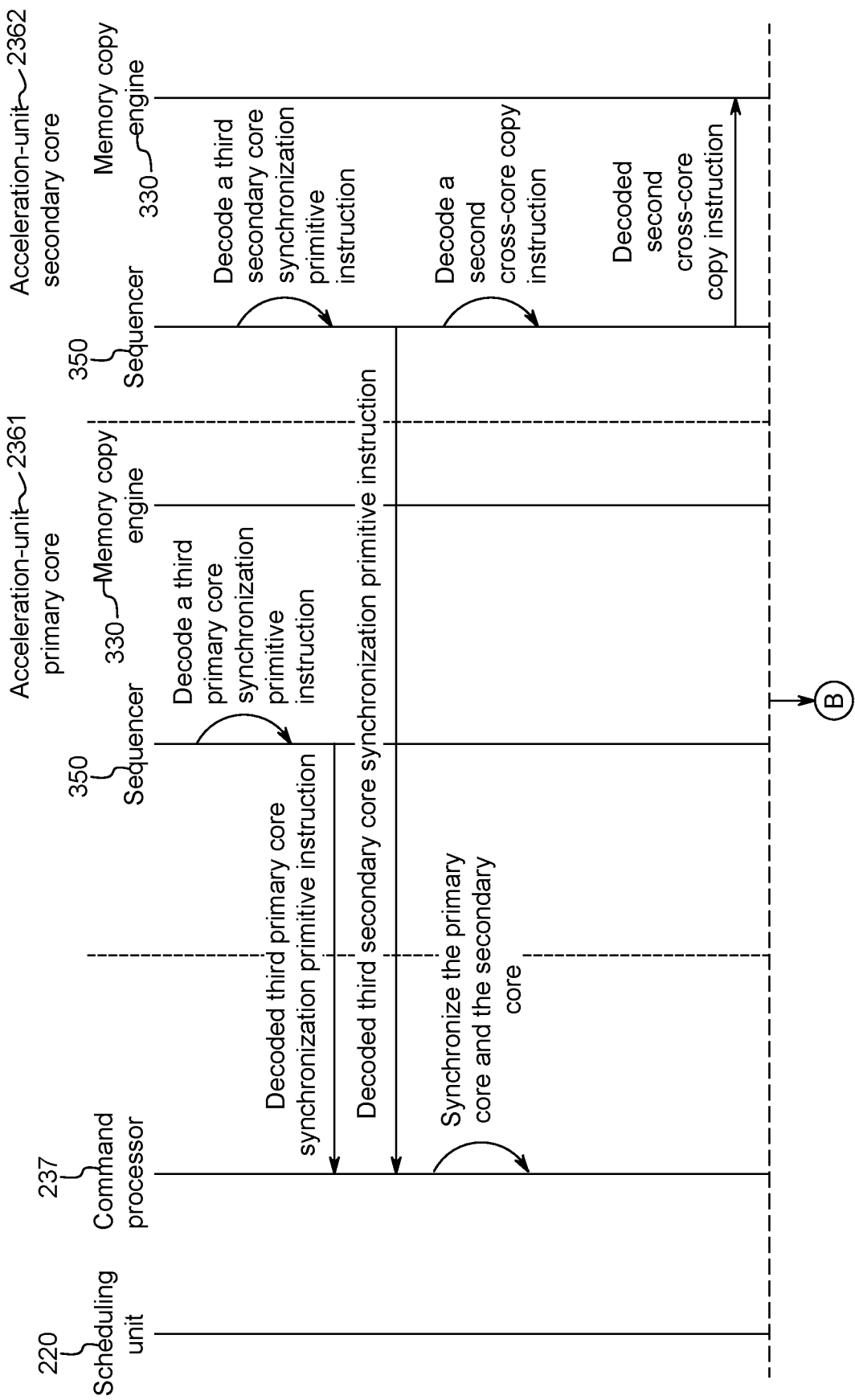
Figure 8B:
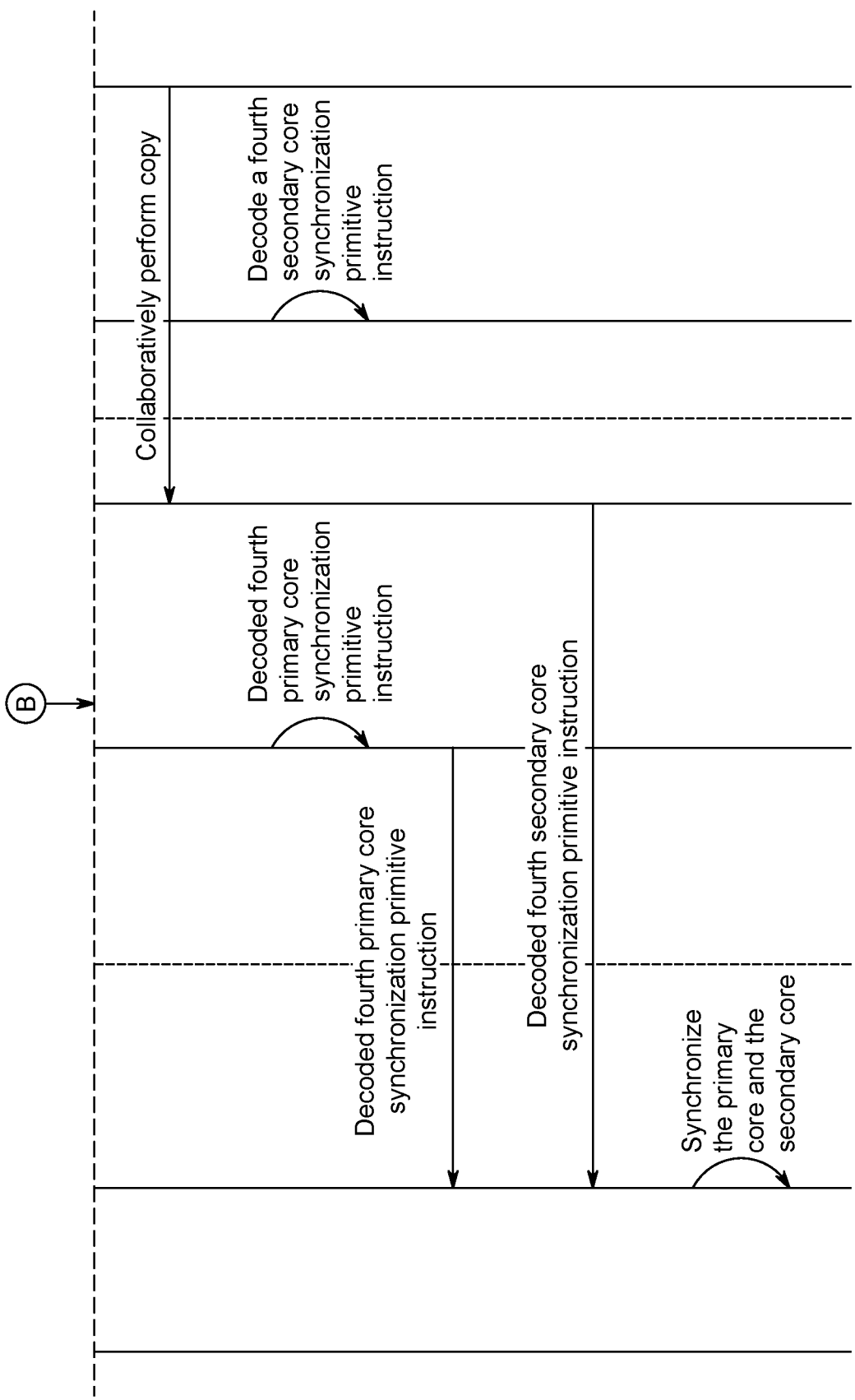

Then, as shown in FIG. 8A and FIG. 8B, the instruction cache 340 of the primary core 2361 receives the third primary core synchronization primitive instruction 413 after receiving and caching an instruction in which the second operand 402 appears in the to-be-executed instruction sequence for the last time. The sequencer 350 of the primary core 2361 decodes the cached third primary core synchronization primitive instruction 413, and sends a decoded third primary core synchronization primitive instruction 413 to the command processor 237 outside the primary core 2361.

The instruction cache 340 of the secondary core 2362 receives and caches the third secondary core synchronization primitive instruction 513. The sequencer 350 of the secondary core 2362 decodes the cached third secondary core synchronization primitive instruction 513, and sends a decoded third secondary core synchronization primitive instruction 513 to the command processor 237 outside the secondary core 2362.

The command processor 237 synchronizes the primary core 2361 and the secondary core 2362 according to the decoded third primary core synchronization primitive instruction 413 and the decoded third secondary core synchronization primitive instruction 513.

Then the instruction cache 340 of the secondary core 2362 receives and caches the second cross-core copy instruction 522, that is, LMCPY r1, s0, inserted in the to-be-executed instruction sequence. The sequencer 350 of the secondary core 2362 decodes the cached second cross-core copy instruction 522, and sends a decoded second cross-core copy instruction 522 to the memory copy engine 330. The second cross-core copy instruction 522 instructs to use the second address in the third register 383 as the source address s0 for cross-core copy, and use the first address in the fourth register 384 as the destination address r1 for cross-core copy. The memory copy engine 330 of the secondary core transfers the first operand in the second address used as the source address back to the first address used as the destination address. In this way, when storage space of the first on-chip memory 3601 of the primary core 2361 is retrieved, an operand temporarily copied to the second on-chip memory 3602 of the secondary core 2362 can be fetched in a timely manner.

In addition, the instruction cache 340 of the primary core 2361 receives and caches the second dumb cross-core copy instruction 422, that is, LMCPY r1, s0 marked by the dashed line on the left side of FIG. 6C, inserted in the to-be-executed instruction sequence. The sequencer 350 of the primary core 2361 decodes the cached second dumb cross-core copy instruction 422, finds that the second dumb cross-core copy instruction 422 is a dumb cross-core copy instruction, and does not process the second dumb cross-core copy instruction 422.

Then the instruction cache 340 of the primary core 2361 receives the fourth primary core synchronization primitive instruction 414 before receiving and caching an instruction cony r10, r1 in which the first operand 401 is used for the first time after the second operand 402 appears in the to-be-executed instruction sequence for the last time. The sequencer 350 of the primary core 2361 decodes the cached fourth primary core synchronization primitive instruction 414, and sends a decoded fourth primary core synchronization primitive instruction 414 to the command processor 237 outside the primary core 2361.

The instruction cache 340 of the secondary core 2362 receives and caches the fourth secondary core synchronization primitive instruction 514. The sequencer 350 of the secondary core 2362 decodes the cached fourth secondary core synchronization primitive instruction 514, and sends a decoded fourth secondary core synchronization primitive instruction 514 to the command processor 237 outside the secondary core 2362.

The command processor 237 synchronizes the primary core 2361 and the secondary core 2362 according to the decoded fourth primary core synchronization primitive instruction 414 and the decoded fourth secondary core synchronization primitive instruction 514.

Collaborative Cross-Core Copy

The foregoing describes only a process of copying an operand that may overflow in the first on-chip memory 3601 of the acceleration-unit primary core 2361 to a second on-chip memory 3602 of a single acceleration-unit secondary core 2362, and copying the operand back when appropriate. However, in practice, collaborative cross-core copy may be performed. Collaborative cross-core copy is a process of copying a plurality of operands that may overflow in a first on-chip memory of an acceleration-unit primary core to on-chip memories of a plurality of acceleration-unit secondary cores, and copying the operand back when appropriate. Collaborative cross-core copy helps improve efficiency of collaborative storage between a plurality of acceleration-unit secondary cores. In particular, when a comparatively large quantity of operands need to be copied, it is very likely that one acceleration-unit secondary core does not have sufficient storage space for accommodating the operands, and storage space of a plurality of acceleration-unit secondary cores needs to be jointly used to meet a requirement. Therefore, this embodiment increases a probability of successful copy and also improves overall storage space utilization of an acceleration unit.

In an embodiment of collaborative cross-core copy, operands to be transferred from an acceleration-unit primary core 2361 include two parts of operands: a first part and a second part. The first part and the second part each may include one or more operands. The first part needs to be transferred from a first on-chip memory 3601 of the acceleration-unit primary core 2361 to a second on-chip memory 3602 of a first acceleration-unit secondary core 2362. The second part needs to be transferred from the first on-chip memory 3601 of the acceleration-unit primary core 2361 to a third on-chip memory 3603 of a second acceleration-unit secondary core 2363. In the foregoing embodiment, an example in which the to-be-transferred operands include two parts is used. However, those skilled in the art know that the to-be-transferred operands may alternatively include three, four, or more parts, to be transferred to on-chip memories of three, four, or more acceleration-unit secondary cores. A principle is the same as that of the case in which two parts are included. Therefore, the following describes a structure and an operating principle of an acceleration unit only by using example in which the operands include two parts. A case in which the operands include three, four, or more parts may be inferred by analogy.

When the operands include two parts, a to-be-transferred operand set is divided into a first part and a second part.

The first part includes one or more operands, stored in storage space of a first address set in the first on-chip memory 3601 of the acceleration-unit primary core 2361, and to be copied to storage space of a second address set in the second on-chip memory 3602 of the first acceleration-unit secondary core 2362. For example, the first address set is 1700-17FF and stores 256 operands, and the second address set is 3800-38FF and may also store 256 operands. In this way, the operands stored in the first address set can be copied to the storage space of the second address set.

The second part includes one or more operands, stored in storage space of a third address set in the first on-chip memory 3601 of the acceleration-unit primary core 2361, and to be copied to storage space of a fourth address set in the third on-chip memory 3603 of the second acceleration-unit secondary core 2363. For example, the third address set is 1800-181F and stores 32 operands, and the fourth address set is 4000-401F and may also store 32 operands. In this way, the operands stored in the third address set can be copied to the storage space of the fourth address set.

Figure 9A:
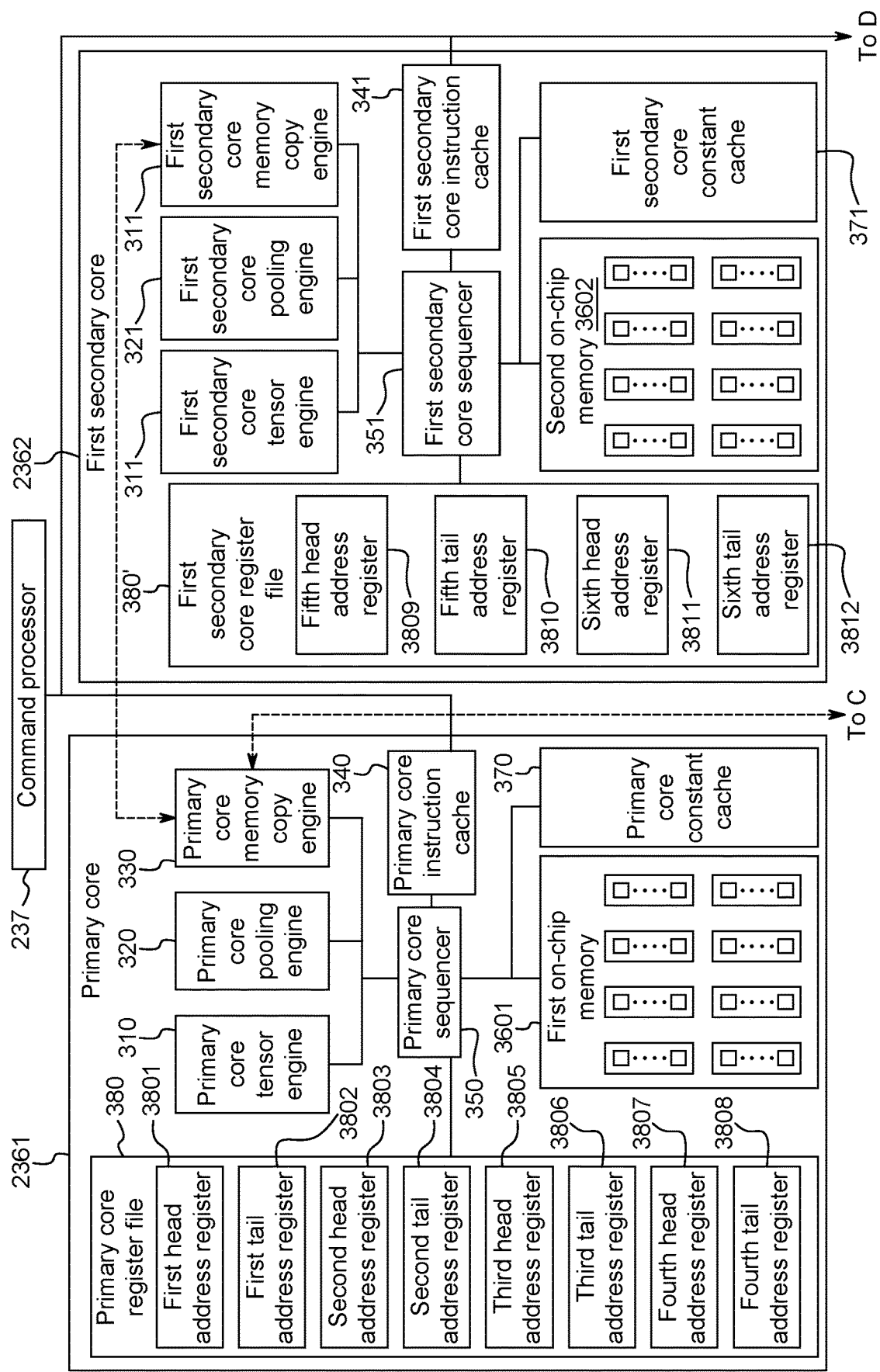
FIG. 9A and FIG. 9B illustrate a structural diagram of an acceleration unit for performing collaborative cross-core copy according to an embodiment of the present disclosure.
Figure 9B:
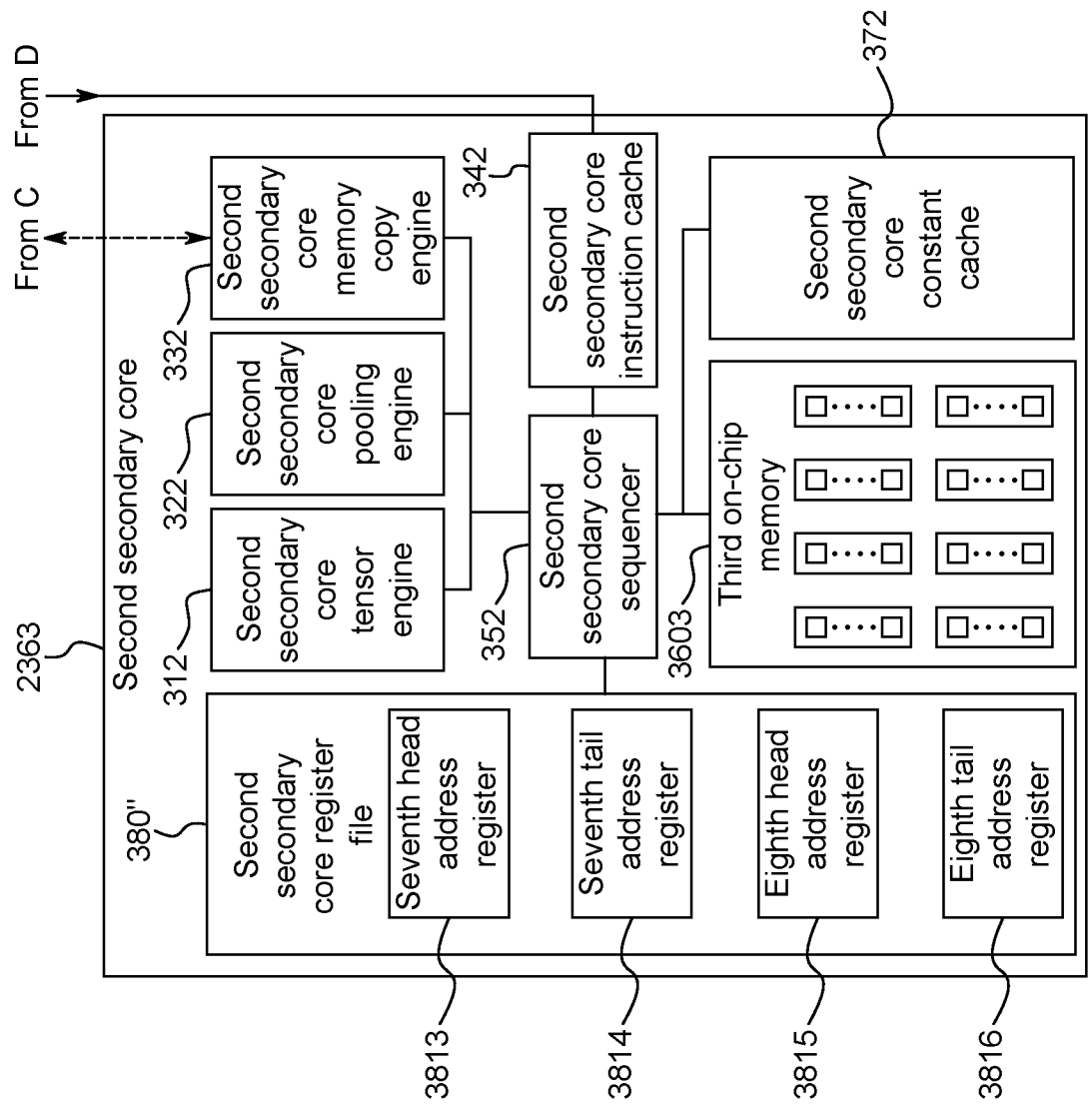

As shown in FIG. 9A and FIG. 9B, the acceleration unit in a collaborative cross-core copy mode includes at least the acceleration-unit primary core 2361, the first acceleration-unit secondary core 2362, and the second acceleration-unit secondary core 2363.

The acceleration-unit primary core 2361 includes a primary core tensor engine 310, a primary core pooling engine 320, a primary core memory copy engine 330, a primary core sequencer 350, a primary core instruction cache 340, the first on-chip memory 3601, a primary core constant cache 370, and a primary core register file 380. A structure of the acceleration-unit primary core 2361 is basically the same as that of the primary core 2361 in FIG. 5. Therefore, details are not described. A difference lies in that the primary core register file 380 includes a first head address register 3801, a first tail address register 3802, a second head address register 3803, a second tail address register 3804, a third head address register 3805, a third tail address register 3806, a fourth head address register 3807, and a fourth tail address register 3808. The first head address register 3801 and the first tail address register 3802 are adapted to store a head address and a tail address of the first address set respectively. The second head address register 3803 and the second tail address register 3804 are adapted to store a head address and a tail address of the second address set respectively. The third head address register 3805 and the third tail address register 3806 are adapted to store a head address and a tail address of the third address set respectively. The fourth head address register 3807 and the fourth tail address register 3808 are adapted to store a head address and a tail address of the fourth address set respectively.

The first acceleration-unit secondary core 2362 includes a first secondary core tensor engine 311, a first secondary core pooling engine 321, a first secondary core memory copy engine 331, a first secondary core primary core sequencer 351, a first secondary core instruction cache 341, the second on-chip memory 3602, a first secondary core constant cache 371, and a first secondary core register file 380'. A structure of the first acceleration-unit secondary core 2362 is basically the same as that of the secondary core 2362 in FIG. 5. Therefore, details are not described. A difference lies in that the first secondary core register file 380' includes a fifth head address register 3809, a fifth tail address register 3810, a sixth head address register 3811, and a sixth tail address register 3812. The fifth head address register 3809 and the fifth tail address register 3810 are adapted to store the head address and the tail address of the second address set respectively. The sixth head address register 3811 and the sixth tail address register 3812 are adapted to store the head address and the tail address of the first address set respectively.

Similar to the first acceleration-unit secondary core 2362, the second acceleration-unit secondary core 2363 includes a second secondary core tensor engine 312, a second secondary core pooling engine 322, a second secondary core memory copy engine 332, a second secondary core secondary core sequencer 352, a second secondary core instruction cache 342, the third on-chip memory 3603, a second secondary core constant cache 372, and a second secondary core register file 380". A function of each part is similar to that of each part in the first acceleration-unit secondary core 2362. Therefore, details are not described. A difference lies in that the second secondary core register file 380" includes a seventh head address register 3813, a seventh tail address register 3814, an eighth head address register 3815, and an eighth tail address register 3816. The seventh head address register 3813 and the seventh tail address register 3814 are adapted to store the head address and the tail address of the fourth address set respectively. The eighth head address register 3815 and the eighth tail address register 3816 are adapted to store the head address and the tail address of the third address set respectively.

First, similar to the foregoing embodiment, after receiving, from the scheduling unit 220, a to-be-executed instruction sequence (for example, an instruction related to a neural network computation) that needs to be executed by the acceleration unit 230, the command processor 237 of the acceleration unit 230 does not directly allocate the to-be-executed instruction sequence to cores, but adds various primary core executable statements required for collaborative cross-core copy to appropriate locations in the to-be-executed instruction sequence and allocates the instructions to the acceleration-unit primary core 2361 for execution, and allocates various secondary core executable statements required for cross-core copy to the first acceleration-unit secondary core 2362 and the second acceleration-unit secondary core 2363, so that the statements collaborate with each other to jointly perform collaborative cross-core copy during actual execution of the to-be-executed instruction sequence.

The command processor 237 determines, according to a preset rule and the to-be-executed instruction sequence, a to-be-transferred operand set in the first on-chip memory 3601 of the acceleration-unit primary core 2361; and determines, based on a remaining storage capacity of the second on-chip memory 3602 of the first acceleration-unit secondary core 2362 and a remaining storage capacity of the third on-chip memory 3603 of the second acceleration-unit secondary core 2363, a first part that needs to be transferred to the second on-chip memory 3602 and a second part that needs to be transferred to the third on-chip memory 3603. Then a head address and a tail address of the first part that are stored in the first address set in the first on-chip memory 3601 are placed in the first head address register 3801 and the first tail address register 3802 respectively; and a head address and a tail address of the first part that are to be stored in the second address set in the second on-chip memory 3602 are placed in the second head address register 3803 and the second tail address register 3804 respectively. A head address and a tail address of the second part that are stored in the third address set in the first on-chip memory 3601 are placed in the third head address register 3805 and the third tail address register 3806 respectively; and a head address and a tail address of the second part that are to be stored in the fourth address set in the third on-chip memory 3603 are placed in the fourth head address register 3807 and the fourth tail address register 3808 respectively.

Then a head address and a tail address of the first part that are stored in the second address set in the second on-chip memory 3602 of the first acceleration-unit secondary core 2362 are placed in the fifth head address register 3809 and the fifth tail address register 3810 respectively; and a head address and a tail address of the second part that are to be copied back to the first address set in the first on-chip memory 3601 of the acceleration-unit primary core 2361 are placed in the sixth head address register 3811 and the sixth tail address register 3812 respectively. Then a head address and a tail address of the second part that are stored in the fourth address set in the third on-chip memory 3603 of the second acceleration-unit secondary core 2363 are placed in the seventh head address register 3813 and the seventh tail address register 3814 respectively; and a head address and a tail address of the second part that are to be stored in the third address set in the first on-chip memory 3601 of the acceleration-unit primary core 2361 are placed in the eighth head address register 3815 and the eighth tail address register 3816 respectively.

The primary core executable statements that are required for collaborative cross-core copy and that are added by the command processor 237 to the to-be-executed instruction sequence include a first cross-core copy instruction. The first cross-core copy instruction instructs to copy the first part of the to-be-transferred operand set from the first address set in the first on-chip memory 3601 to the second address set in the second on-chip memory 3602 of the first acceleration-unit secondary core 2362, and copy the second part of the to-be-transferred operand set from the third address set in the first on-chip memory 3601 to the fourth address set in the third on-chip memory 3603 of the second acceleration-unit secondary core 2362. The primary core executable statements that are required for collaborative cross-core copy and that are added by the command processor 237 to the to-be-executed instruction sequence may further include synchronization primitive instructions similar to the synchronization primitive instructions on the left side of FIG. 6C.

In addition, the command processor 237 may further generate, for the first acceleration-unit secondary core 2362 and the second acceleration-unit secondary core 2363 respectively, first acceleration-unit secondary core executable statements and second acceleration-unit secondary core executable statements that are required for collaborative cross-core copy.

The first acceleration-unit secondary core executable statements required for collaborative cross-core copy include a second cross-core copy instruction. The second cross-core copy instruction instructs to copy the first part from the second address set in the second on-chip memory 3602 back to the first address set in the first on-chip memory 3601. In addition, the first acceleration-unit secondary core executable statements required for collaborative cross-core copy further include synchronization primitive instructions similar to the synchronization primitive instructions on the right side of FIG. 6C.

The second acceleration-unit secondary core executable statements required for collaborative cross-core copy include a third cross-core copy instruction. The third cross-core copy instruction instructs to copy the second part from the fourth address set in the third on-chip memory 3603 back to the third address set in the first on-chip memory 3601. In addition, the second acceleration-unit secondary core executable statements required for collaborative cross-core copy further include synchronization primitive instructions similar to the synchronization primitive instructions on the right side of FIG. 6C.

In actual execution, after the primary core instruction cache 340 of the acceleration-unit primary core 2361 receives a to-be-executed instruction sequence in which various instructions required for performing collaborative cross-core copy have been inserted by the command processor 237, the primary core sequencer 350 sequentially fetches the instructions from the primary core instruction cache 340 for decoding. It is found that the first cross-core copy instruction is fetched. The first cross-core copy instruction instructs to fetch a first part between the head address in the first head address register 3801 and the tail address in the first tail address register 3802 in the first on-chip memory 3601 and copy the first part to a location between the head address in the second head address register 3803 and the tail address in the second tail address register 3804 in the second on-chip memory 3602, and to fetch a second part between the head address in the third head address register 3805 and the tail address in the third tail address register 3806 in the first on-chip memory 3601 and copy the second part to a location between the head address in the fourth head address register 3807 and the tail address in the fourth tail address register 3808 in the third on-chip memory 3603.

The primary core sequencer 350 sends a decoded instruction to the memory copy engine 330 of the acceleration-unit primary core 2361 for execution. The primary core memory copy engine 330 receives and executes the decoded first cross-core copy instruction 421; fetches the first part between the head address in the first head address register 3801 and the tail address in the first tail address register 3802 in the first on-chip memory 3601, and copies the first part to the location between the head address in the second head address register 3803 and the tail address in the second tail address register 3804 in the second on-chip memory 3602; and fetches the second part between the head address in the third head address register 3805 and the tail address in the third tail address register 3806 in the first on-chip memory 3601, and copies the second part to the location between the head address in the fourth head address register 3807 and the tail address in the fourth tail address register 3808 in the third on-chip memory 3603.

After the first secondary core instruction cache 341 of the first acceleration-unit secondary core 2362 receives instructions that need to be executed by the first secondary core for cross-core copy and that are allocated by the command processor 237, the first secondary core sequencer 351 sequentially fetches the instructions from the first secondary core instruction cache 340 for decoding. It is found that the second cross-core copy instruction is fetched. The second cross-core copy instruction instructs to fetch a first part between the head address in the fifth head address register 3809 and the tail address in the fifth tail address register 3810 in the second on-chip memory 3602, and copy the first part back to a location between the head address in the sixth head address register 3811 and the tail address in the sixth tail address register 3812 in the first on-chip memory 3601.

The first secondary core sequencer 351 sends a decoded instruction to the first secondary core memory copy engine 331 of the first acceleration-unit secondary core 2362 for execution. The first secondary core memory copy engine 331 receives and executes the decoded second cross-core copy instruction, to fetch the first part between the head address in the fifth head address register 3809 and the tail address in the fifth tail address register 3810 in the second on-chip memory 3602, and copy the first part back to the location between the head address in the sixth head address register 3811 and the tail address in the sixth tail address register 3812 in the first on-chip memory 3601.

After the second secondary core instruction cache 342 of the second acceleration-unit secondary core 2363 receives instructions that need to be executed by the second secondary core for cross-core copy and that are allocated by the command processor 237, the second secondary core sequencer 352 sequentially fetches the instructions from the second secondary core instruction cache 342 for decoding. It is found that the third cross-core copy instruction is fetched. The third cross-core copy instruction instructs to fetch a second part between the head address in the seventh head address register 3813 and the tail address in the seventh tail address register 3814 in the third on-chip memory 3603, and copy the second part back to a location between the head address in the eighth head address register 3815 and the tail address in the eighth tail address register 3816 in the first on-chip memory 3601.

The second secondary core sequencer 352 sends a decoded instruction to the second secondary core memory copy engine 332 of the second acceleration-unit secondary core 2363 for execution. The second secondary core memory copy engine 332 receives and executes the decoded third cross-core copy instruction, to fetch the second part between the head address in the seventh head address register 3813 and the tail address in the seventh tail address register 3814 in the second on-chip memory 3603, and copy the second part back to the location between the head address in the eighth head address register 3815 and the tail address in the eighth tail address register 3816 in the first on-chip memory 3601.

The primary core sequencer 350 may receive a synchronization primitive instruction from the primary core instruction cache 340, the first secondary core sequencer 351 may also receive a synchronization primitive instruction from the first secondary core instruction cache 341, and the second secondary core sequencer 352 may also receive a synchronization primitive instruction from the second secondary core instruction cache 342. Processing performed after the primary core sequencer 350, the first secondary core sequencer 351, and the second secondary core sequencer 352 receive these synchronization primitive instructions is the same as the foregoing processing performed after the primary and secondary core sequencers receive the synchronization primitive instructions in FIG. 6C. Therefore, details are not described.

With the foregoing process, the following is generally implemented: When the first on-chip memory 3601 of the acceleration-unit primary core 2361 may overflow, the to-be-transferred first part of operands in the first on-chip memory 3601 is transferred from the first on-chip memory 3601 of the acceleration-unit primary core 2361 to the second on-chip memory 3602 of the first acceleration-unit secondary core 2362, and the to-be-transferred second part of operands is transferred from the first on-chip memory 3601 of the acceleration-unit primary core 2361 to the third on-chip memory 3603 of the second acceleration-unit secondary core 2363; and the first part and the second part are transferred back to the first on-chip memory 3601 when appropriate.

Business Value of Embodiments of the Present Disclosure

In embodiments of the present disclosure, when an operand in an intra-core on-chip memory may overflow and therefore needs to be transferred, operand transfer efficiency is greatly improved, and performance of an acceleration unit is improved. Experiments show that a speed of such an acceleration unit for computations of a neural network model is approximately twice as fast, thereby greatly increasing an inference speed of a neural network and having a good market prospect.

It should be understood that the foregoing descriptions are merely preferred embodiments of the present disclosure, but are not intended to limit the present disclosure. For those skilled in the art, there are many variations to the embodiments of this specification. Any modification, equivalent replacement, or improvement made within the spirit and principle of the present disclosure shall fall within the protection scope of the present disclosure.

It should be understood that the embodiments in this specification are described in a progressive manner, and for same or similar parts between the embodiments, reference may be made to each other. Each embodiment focuses on a difference from other embodiments. In particular, the method embodiment is basically similar to the method described in the device and system embodiments, and therefore is briefly described. For related parts, refer to the descriptions in the other embodiments.

It should be understood that the foregoing describes specific embodiments of this specification. Other embodiments fall within the scope of the claims. In some cases, the actions or the steps described in the claims may be performed in a sequence different from that in the embodiments but still implement an expected result. In addition, a process shown in the accompanying drawings does not necessarily require a specific sequence or a consecutive sequence for implementing an expected result. In some implementations, multi-task processing and parallel processing are also allowed, or may be advantageous.

It should be understood that an element described in a singular form in this specification or displayed as one element in the accompanying drawings does not mean that a quantity of the element is limited to one. In addition, modules or elements described or shown as separate modules or elements in this specification may be combined into a single module or element, and a module or an element described or shown as a single module or element in this specification may be split into a plurality of modules or elements.

It should be further understood that the terms and expressions used in this specification are merely intended for description, and one or more embodiments of this specification should not be limited to these terms and expressions. Use of these terms and expressions does not mean to exclude any equivalent features of illustrations and descriptions (or part of them), and it should be learned that various possible modifications should also be included in the scope of the claims. Other modifications, changes, and replacements may also exist. Correspondingly, the claims should be regarded as covering all these equivalents.

What is claimed is:

1. An acceleration unit comprising an acceleration-unit primary core and an acceleration-unit secondary core, wherein
the acceleration-unit primary core comprises:
a first on-chip memory;
a primary core sequencer adapted to decode a received first cross-core copy instruction, wherein the first cross-core copy instruction instructs to copy a first operand from a first address in the first on-chip memory to a second address in a second on-chip memory of the acceleration-unit secondary core; and
a primary core memory copy engine adapted to receive and execute the decoded first cross-core copy instruction, to acquire the first operand from the first address in the first on-chip memory, and copy the acquired first operand to the second address in the second on-chip memory; and
the acceleration-unit secondary core comprises:
the second on-chip memory;
a secondary core sequencer adapted to decode a received second cross-core copy instruction, wherein the second cross-core copy instruction instructs to copy the first operand from the second address in the second on-chip memory back to the first address in the first on-chip memory; and
a secondary core memory copy engine adapted to receive and execute the decoded second cross-core copy instruction, to acquire the first operand from the second address in the second on-chip memory and copy the acquired first operand back to the first address in the first on-chip memory.

2. The acceleration unit according to claim 1, wherein
the acceleration-unit primary core further comprises a first register and a second register adapted to store the first address and the second address respectively, wherein the first cross-core copy instruction instructs to use the first address in the first register as a source address for cross-core copy, and use the second address in the second register as a destination address for cross-core copy, so that the primary core memory copy engine transfers the first operand in the first address to the second address; and
the acceleration-unit secondary core further comprises a third register and a fourth register adapted to store the second address and the first address respectively, wherein the second cross-core copy instruction instructs to use the second address in the third register as a source address for cross-core copy, and use the first address in the fourth register as a destination address for cross-core copy, so that the secondary core memory copy engine transfers the first operand in the second address back to the first address.

3. The acceleration unit according to claim 2, wherein the acceleration unit has a plurality of secondary cores, and the second address in the second register is a second address in a second on-chip memory of a selected acceleration-unit secondary core in the plurality of acceleration-unit secondary cores.

4. The acceleration unit according to claim 3, wherein the selected acceleration-unit secondary core is selected from the plurality of acceleration-unit secondary cores based on a distance from each of the plurality of acceleration-unit secondary cores to the acceleration-unit primary core.

5. The acceleration unit according to claim 1, wherein the acceleration-unit primary core further comprises a primary core instruction cache adapted to receive and cache the first cross-core copy instruction and provide the first cross-core copy instruction to the primary core sequencer, and the acceleration-unit secondary core further comprises a secondary core instruction cache adapted to receive and cache the second cross-core copy instruction and provide the second cross-core copy instruction to the secondary core sequencer.

6. The acceleration unit according to claim 5, wherein
the primary core instruction cache is adapted to, before receiving and caching the first cross-core copy instruction, receive and cache a first primary core synchronization primitive instruction used to synchronize the acceleration-unit primary core and the acceleration-unit secondary core, and the primary core sequencer is adapted to decode the cached first primary core synchronization primitive instruction, and send the decoded first primary core synchronization primitive instruction to a command processor outside the acceleration-unit primary core; and
the secondary core instruction cache is adapted to receive and cache a first secondary core synchronization primitive instruction corresponding to the first primary core synchronization primitive instruction and a first dumb cross-core copy instruction corresponding to the first cross-core copy instruction, and the secondary core sequencer is adapted to decode the cached first secondary core synchronization primitive instruction and first dumb cross-core copy instruction, send the decoded first secondary core synchronization primitive instruction to a command processor outside the acceleration-unit secondary core for synchronizing the acceleration-unit primary core and the acceleration-unit secondary core according to the first primary core synchronization primitive instruction and the first secondary core synchronization primitive instruction, and ignore the decoded first dumb cross-core copy instruction.

7. The acceleration unit according to claim 6, wherein
the primary core instruction cache receives and caches the first primary core synchronization primitive instruction after receiving and caching an instruction in which the first operand is used for the last time before a second operand appears in a to-be-executed instruction sequence, wherein the second operand is an operand that is to cause the first on-chip memory to overflow when the to-be-executed instruction sequence is executed.

8. The acceleration unit according to claim 7, wherein
the primary core instruction cache receives and caches a second primary core synchronization primitive instruction before receiving and caching an instruction in which the second operand appears in the to-be-executed instruction sequence for the first time, and the primary core sequencer is adapted to decode the cached second primary core synchronization primitive instruction, and send the decoded second primary core synchronization primitive instruction to the command processor outside the acceleration-unit primary core; and
the secondary core instruction cache receives and caches a second secondary core synchronization primitive instruction corresponding to the second primary core synchronization primitive instruction after receiving and caching the first dumb cross-core copy instruction, and the secondary core sequencer is adapted to decode the cached second secondary core synchronization primitive instruction, and send the decoded second secondary core synchronization primitive instruction to the command processor outside the acceleration-unit secondary core for synchronizing the acceleration-unit primary core and the acceleration-unit secondary core according to the second primary core synchronization primitive instruction and the second secondary core synchronization primitive instruction.

9. The acceleration unit according to claim 8, wherein
the primary core instruction cache sequentially receives a third primary core synchronization primitive instruction and a second dumb cross-core copy instruction corresponding to the second cross-core copy instruction after receiving and caching an instruction in which the second operand appears in the to-be-executed instruction sequence for the last time, and the primary core sequencer is adapted to decode the cached third primary core synchronization primitive instruction and second dumb cross-core copy instruction, and send the decoded third primary core synchronization primitive instruction to the command processor outside the acceleration-unit primary core, and ignore the decoded second dumb cross-core copy instruction; and
the secondary core instruction cache receives and caches a third secondary core synchronization primitive instruction before receiving and caching the second cross-core copy instruction and after receiving and caching the second secondary core synchronization primitive instruction, and the secondary core sequencer is adapted to decode the cached third secondary core synchronization primitive instruction, and send the decoded third secondary core synchronization primitive instruction to the command processor outside the acceleration-unit secondary core for synchronizing the acceleration-unit primary core and the acceleration-unit secondary core according to the third primary core synchronization primitive instruction and the third secondary core synchronization primitive instruction.

10. The acceleration unit according to claim 9, wherein
the primary core instruction cache receives and caches a fourth primary core synchronization primitive instruction before receiving and caching an instruction in which the first operand is used for the first time after the second operand appears in the to-be-executed instruction sequence for the last time, and the primary core sequencer is adapted to decode the cached fourth primary core synchronization primitive instruction, and send the decoded fourth primary core synchronization primitive instruction to the command processor outside the acceleration-unit primary core; and
the secondary core instruction cache receives and caches a fourth secondary core synchronization primitive instruction corresponding to the fourth primary core synchronization primitive instruction after receiving and caching the second cross-core copy instruction, and the secondary core sequencer is adapted to decode the cached fourth secondary core synchronization primitive instruction, and send the decoded fourth secondary core synchronization primitive instruction to the command processor outside the acceleration-unit secondary core for synchronizing the acceleration-unit primary core and the acceleration-unit secondary core according to the fourth primary core synchronization primitive instruction and the fourth secondary core synchronization primitive instruction.

11. The acceleration unit according to claim 1, integral in a system-on-a-chip.

12. The acceleration unit according to claim 1, integral in a server comprising:
a memory storing a computer-executable instruction; and a scheduling unit adapted to, in a process of executing computer-executable instructions stored in the memory, determine a to-be-executed instruction sequence that needs to be executed by the acceleration unit, and allocate the to-be-executed instruction sequence to the acceleration unit.

13. The acceleration unit according to claim 12, integral with a data center.

14. An acceleration unit, comprising an acceleration-unit primary core, a first acceleration-unit secondary core, and a second acceleration-unit secondary core, wherein
the acceleration-unit primary core comprises:
a first on-chip memory;
a primary core sequencer adapted to decode a received first cross-core copy instruction, wherein the first cross-core copy instruction instructs to copy a first part of a to-be-transferred operand set from a first address set in the first on-chip memory to a second address set in a second on-chip memory of the first acceleration-unit secondary core, and copy a second part of the to-be-transferred operand set from a third address set in the first on-chip memory to a fourth address set in a third on-chip memory of the second acceleration-unit secondary core; and
a primary core memory copy engine adapted to receive and execute the decoded first cross-core copy instruction, to acquire the first part from the first address set in the first on-chip memory and copy the acquired first part to the second address set in the second on-chip memory of the first acceleration-unit secondary core, and to acquire the second part from the third address set in the first on-chip memory and copy the acquired second part to the fourth address set in the third on-chip memory of the second acceleration-unit secondary core;
the first acceleration-unit secondary core comprises:
the second on-chip memory;
a first secondary core sequencer adapted to decode a received second cross-core copy instruction, wherein the second cross-core copy instruction instructs to copy the first part from the second address set in the second on-chip memory back to the first address set in the first on-chip memory; and
a first secondary core memory copy engine adapted to receive and execute the decoded second cross-core copy instruction, to acquire the first part from the second address set in the second on-chip memory and copy the acquired first part back to the first address set in the first on-chip memory; and
the second acceleration-unit secondary core comprises:
the third on-chip memory;
a second secondary core sequencer adapted to decode a received third cross-core copy instruction, wherein the third cross-core copy instruction instructs to copy the second part from the fourth address set in the third on-chip memory back to the third address set in the first on-chip memory; and
a second secondary core memory copy engine adapted to receive and execute the decoded third cross-core copy instruction, to acquire the second part from the fourth address set in the third on-chip memory and copy the acquired second part back to the third address set in the first on-chip memory.

15. The acceleration unit according to claim 14, wherein the acceleration-unit primary core further comprises: a first head address register and a first tail address register adapted to store a head address and a tail address of the first address set respectively, a second head address register and a second tail address register adapted to store a head address and a tail address of the second address set respectively, a third head address register and a third tail address register adapted to store a head address and a tail address of the third address set respectively, and a fourth head address register and a fourth tail address register adapted to store a head address and a tail address of the fourth address set respectively, wherein
the first cross-core copy instruction instructs to fetch a first part between the head address in the first head address register and the tail address in the first tail address register in the first on-chip memory, and copy the first part to between the head address in the second head address register and the tail address in the second tail address register in the second on-chip memory, and to fetch a second part between the head address in the third head address register and the tail address in the third tail address register in the first on-chip memory, and copy the second part to between the head address in the fourth head address register and the tail address in the fourth tail address register in the third on-chip memory, wherein
the first acceleration-unit secondary core further comprises: a fifth head address register and a fifth tail address register adapted to store the head address and the tail address of the second address set respectively, and a sixth head address register and a sixth tail address register adapted to store the head address and the tail address of the first address set respectively, wherein
the second cross-core copy instruction instructs to fetch a first part between the head address in the fifth head address register and the tail address in the fifth tail address register in the second on-chip memory, and copy the first part back to a location between the head address in the sixth head address register and the tail address in the sixth tail address register in the first on-chip memory, wherein
the second acceleration-unit secondary core further comprises: a seventh head address register and a seventh tail address register adapted to store the head address and the tail address of the fourth address set respectively, and an eighth head address register and an eighth tail address register adapted to store the head address and the tail address of the third address set respectively, and wherein
the third cross-core copy instruction instructs to fetch a second part between the head address in the seventh head address register and the tail address in the seventh tail address register in the third on-chip memory, and copy the second part back to a location between the head address in the eighth head address register and the tail address in the eighth tail address register in the first on-chip memory.

16. The acceleration unit according to claim 14, wherein the acceleration-unit primary core further comprises a primary core instruction cache adapted to receive and cache the first cross-core copy instruction and provide the first cross-core copy instruction to the primary core sequencer, the first acceleration-unit secondary core further comprises a first secondary core instruction cache adapted to receive and cache the second cross-core copy instruction and provide the second cross-core copy instruction to the first secondary core sequencer, and the second acceleration-unit secondary core further comprises a second secondary core instruction cache adapted to receive and cache the third cross-core copy instruction and provide the third cross-core copy instruction to the second secondary core sequencer.

17. A cross-core copy method for an acceleration unit, wherein the acceleration unit comprises an acceleration-unit primary core and an acceleration-unit secondary core, the method comprising:
  decoding and executing a received first cross-core copy instruction by using the acceleration-unit primary core, to acquire a first operand from a first address in a first on-chip memory of the acceleration-unit primary core, and copy the acquired first operand to a second address in a second on-chip memory of the acceleration-unit secondary core; and
  decoding and executing a received second cross-core copy instruction by using the acceleration-unit secondary core, to acquire the first operand from the second address in the second on-chip memory of the acceleration-unit secondary core, and copy the acquired first operand back to the first address in the first on-chip memory of the acceleration-unit primary core.

18. The cross-core copy method for the acceleration unit of claim 17, wherein the acceleration unit is integral with a system-on-a-chip.

19. A cross-core copy method for an acceleration unit, wherein the acceleration unit comprises an acceleration-unit primary core, a first acceleration-unit secondary core, and a second acceleration-unit secondary core, and the method comprises:
  decoding and executing a received first cross-core copy instruction by using the acceleration-unit primary core, to acquire a first part from a first address set in a first on-chip memory and copy the acquired first part to a second address set in a second on-chip memory of the first acceleration-unit secondary core, and to acquire a second part from a third address set in the first on-chip memory and copy the acquired second part to a fourth address set in a third on-chip memory of the second acceleration-unit secondary core;
  decoding and executing a received second cross-core copy instruction by using the first acceleration-unit secondary core, to acquire the first part from the second address set in the second on-chip memory, and copy the acquired first part back to the first address set in the first on-chip memory; and
  decoding and executing a received third cross-core copy instruction by using the second acceleration-unit secondary core, to acquire the second part from the fourth address set in the third on-chip memory and copy the acquired second part back to the third address set in the first on-chip memory.

20. The cross-core copy method for the acceleration unit of claim 19, wherein the acceleration unit is integral with a system-on-a-chip.

* * * * *